US008543779B2

(12) United States Patent
Nakanishi et al.

(10) Patent No.: US 8,543,779 B2
(45) Date of Patent: Sep. 24, 2013

(54) MANAGEMENT SYSTEM AND MANAGEMENT METHOD FOR MANAGING COMPUTER SYSTEM

(75) Inventors: Yuki Nakanishi, Kawasaki (JP); Yukinori Sakashita, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 334 days.

(21) Appl. No.: 12/937,108

(22) PCT Filed: Jul. 26, 2010

(86) PCT No.: PCT/JP2010/062520
§ 371 (c)(1), (2), (4) Date: Oct. 8, 2010

(87) PCT Pub. No.: WO2012/011194
PCT Pub. Date: Jan. 26, 2012

(65) Prior Publication Data
US 2012/0030442 A1    Feb. 2, 2012

(30) Foreign Application Priority Data

Jul. 20, 2010    (JP) ................................. 2010-162737

(51) Int. Cl.
*G06F 12/00*    (2006.01)
(52) U.S. Cl.
USPC ......................................... 711/154; 711/170
(58) Field of Classification Search
None
See application file for complete search history.

(56) References Cited

U.S. PATENT DOCUMENTS

| | | | |
|---|---|---|---|
| 6,108,748 A | 8/2000 | Ofek et al. | |
| 2003/0204597 A1 | 10/2003 | Arakawa et al. | |
| 2005/0033936 A1* | 2/2005 | Nakano et al. | 711/170 |
| 2005/0055370 A1* | 3/2005 | Fukuda et al. | 707/103 X |
| 2006/0253549 A1* | 11/2006 | Arakawa et al. | 709/217 |
| 2007/0113037 A1 | 5/2007 | Eguchi et al. | |
| 2007/0192561 A1* | 8/2007 | Satoyama et al. | 711/170 |
| 2007/0233952 A1 | 10/2007 | Tanaka et al. | |
| 2008/0059704 A1* | 3/2008 | Kavuri | 711/117 |
| 2009/0043982 A1 | 2/2009 | Kano et al. | |
| 2009/0276569 A1 | 11/2009 | Yamamoto et al. | |

FOREIGN PATENT DOCUMENTS

| | | |
|---|---|---|
| JP | 2000-112822 | 4/2000 |
| JP | 2000-293317 | 10/2000 |
| JP | 2003-15915 | 1/2003 |
| JP | 2003-316522 | 11/2003 |
| JP | 2003-345522 | 12/2003 |
| JP | 2005-25244 | 1/2005 |
| JP | 2005-275526 | 10/2005 |
| WO | 2006/038286 A1 | 4/2006 |

\* cited by examiner

*Primary Examiner* — Kevin Verbrugge
*Assistant Examiner* — Daniel Tsui
(74) *Attorney, Agent, or Firm* — Brundidge & Stanger, P.C.

(57)    ABSTRACT

A management system, coupled to a computer system including one or more types of storage apparatus, stores management information. The management information includes: (a) information containing, for each request by an administrator, information indicating a storage function (a function of a storage apparatus) required in order to achieve a function satisfying the administrator request; and (b) information containing, for each storage apparatus, information indicating storage functions. The management system: (A) receives a request of an administrator; (B) identifies an implementation pattern including a storage apparatus having a storage function required to achieve a function satisfying the received administrator request, on the basis of the information (a) and (b), and (C) performs setup in order to achieve a function satisfying the received administrator request, in respect of any of the identified one or more implementation patterns.

13 Claims, 22 Drawing Sheets

FIG.5

| User Request | Function ID | Function Name | Target System |
|---|---|---|---|
| Automatic Capacity Expansion | TP1 | HDP | Storage |
| | TP2 | LUSE | Storage |
| | | Windows | Host |
| | TP3 | LUSE | Storage |
| | TP4 | ZFS | Host |
| Security Volume | SV1 | Ext | Hos tA |
| | | Copy | Host B |
| | | Security Volume | Storage A |
| | | - | Storage B |
| Migration | MG1 | Copy | Storage |
| | MG2 | Copy | Host |
| | | Path Software | Host |
| | MG3 | Migration P.P. | Storage |
| ... | ... | ... | ... |

| Function ID | Restrictions | Implementation Pattern ID |
|---|---|---|
| TP2 | Size Reduction Disabled | - |
|  | Read Only Prohibited | - |
| TP3 | Size Reduction Disabled | - |
|  | Read Only Prohibited | - |
|  | Capacity Expansion Disabled When On | 1 |
| SV1 | Access Prohibited From Host B | - |
| MG1 | Disabled When On | - |
| MG2 | Large Host Load | - |
| ... | ... |  |

| System ID | Function Name |
|---|---|
| Host.1000 | NTFS |
| | Copy |
| DF700.20001 | LUSE |
| DF600.20002 | Copy |
| | HDP |
| ... | ... |

| Storage Sub-System ID | LUN | Host ID |
|---|---|---|
| DF700.20001 | 0 | Host.1000 |
| DF700.20001 | 1 | - |
| DF700.20001 | 2 | - |
| DF600.20002 | 0 | Host.1000 |
| DF600.20002 | 1 | - |
| ... | ... | ... |

FIG.9

| 42301 | 42302 | 42303 | 42304 | 42305 | 42305 |
|---|---|---|---|---|---|
| Impleme-ntation Pattern ID | User Request | Storage ID | Host ID | Function ID | Implementation Enabled/Disabled |
| 1 | Automatic Capacity Expansion | DF700.20001 | Host.1000 | TP3 | Enabled |
| 2 | Automatic Capacity Expansion | DF600.20002 | Host.1000 | TP1 | Enabled |
| 3 | Security Volume | DF600.20001 | Host.2000 | AC1 | Disabled |
| 3 | Security Volume | DF700.20001 | Host.2000 | AC1 | Disabled |
| 3 | Security Volume | DF600.20001 | Host.3000 | AC1 | Disabled |
| 3 | Security Volume | DF700.20001 | Host.4000 | AC1 | Disabled |
| 4 | Migration | DF700.20001 | Host.1000 | MG1 | Disabled |
| 4 | Migration | DF600.20002 | Host.1000 | MG1 | Disabled |
| ... | ... | ... | ... | ... | ... |

| System ID (42401) | Device (42402) | Time (42403) | IOPS (42404) |
|---|---|---|---|
| Host.1000 | HBA1 | Mon_00:00-Mon_01:00 | 1.8G |
| | | Mon_01:00-Mon_02:00 | 2.2G |
| | | Mon_02:00-Mon_03:00 | 1.2G |
| | HBA2 | Mon_00:00-Mon_01:00 | 2.2G |
| | | Mon_01:00-Mon_02:00 | 2.2G |
| | | Mon_02:00-Mon_03:00 | 1.1G |
| DF700.20001 | Port1 | Mon_00:00-Mon_01:00 | 1.8G |
| | | Mon_01:00-Mon_02:00 | 1.6G |
| | | Mon_02:00-Mon_03:00 | 1.2G |
| DF600.20002 | Port2 | Mon_00:00-Mon_01:00 | 1.0G |
| | | Mon_01:00-Mon_02:00 | 2.5G |
| | | Mon_02:00-Mon_03:00 | 1.2G |
| ... | ... | ... | |

4240

MANAGEMENT SYSTEM AND MANAGEMENT METHOD FOR MANAGING COMPUTER SYSTEM

TECHNICAL FIELD

The present invention relates to the management of a computer system.

BACKGROUND ART

The functions of a storage apparatus (hereinafter, called "storage sub-system") include the following functions, for example.

A first function is an automatic capacity expansion function (for example, Patent Literature 1). By means of an automatic capacity expansion function, a storage sub-system allocates a portion of the region of a physical resource (hereinafter, called a "segment") to a logical storage area (hereinafter, called "logical volume") in response to an access request from a host computer. By this means, the capacity of the logical volume is automatically expanded.

A second function is an access control function (for example, Patent Literature 2). By means of an access control function, a storage sub-system manages access attributes (for example, read only, writeable and readable) for each logical volume, and controls permission or denial of access to the logical volume on the basis of the access attributes corresponding to that logical volume.

A third function is a migration function (for example, Patent Literatures 3 to 5). By means of a migration function, a storage sub-system migrates the data in a logical volume to another logical volume.

A virtual logical volume of which the capacity is automatically expanded by the automatic capacity expansion function is called an "automatic capacity expansion volume" in the present specification. Furthermore, a logical storage device on a RAID (Redundant Array of Independent Disks) which is constituted by a plurality of physical storage devices (for example, hard disk drives or flash memory devices) is called a "physical resource" in the present specification. Moreover, a logical volume with which access attributes have been associated is called a "security volume".

CITATION LIST

Patent Literature

[PTL 1]
Japanese Patent Application Laid-open No. 2003-15915
[PTL 2]
Japanese Patent Application Laid-open No. 2000-112822
[PTL 3]
Japanese Patent Application Laid-open No. 2000-293317
[PTL 4]
U.S. Pat. No. 6,108,748
[PTL 5]
Japanese Patent Application Laid-open No. 2003-345522

SUMMARY OF INVENTION

Technical Problem

An administrator of the storage sub-system (hereinafter, called the "user") manages the storage sub-system inside a computer system.

The number of storage sub-systems included in a computer system has been rising with the increasing scale of computer systems. Therefore, the number of storage sub-systems which must be managed by the user has been increasing.

Furthermore, a computer system having a hetero environment is also known. A computer system of this kind includes a combination of storage sub-systems of a plurality of different types (for example, storage sub-systems from different vendors and/or new and old storage sub-systems). Here, the type of storage sub-system may be specified by at least one of the vendor, functions, configuration and characteristics of the storage sub-system.

In order to set an object (for example, a logical volume or a path to a logical volume) where the functions desired by the user are displayed, the user must recognize the type of storage sub-system. For example, when wishing to create an automatic capacity expansion volume displaying functions desired by the user, the user decides which storage sub-system to create the automatic capacity expansion volume in, on the basis of the types of the respective storage sub-systems.

The object of the present invention is to be able to make settings whereby functions satisfying an administrator's requirements are displayed, without the administrator (user) being aware of the type of storage apparatus (storage sub-system).

Solution to Problem

A management system coupled to a computer system including storage sub-systems of one or more types comprises a storage resource which stores management information and a processor which is coupled to the storage resource. The management information includes: (a) request/function correspondence information which is information containing, for each user request, information indicating a storage function (a function held by the storage sub-system) required in order to achieve a function satisfying a user request; and (b) function information which is information containing, for each storage sub-system, information indicating storage functions of the storage sub-system included in the computer system. The processor executes: (A) reception of a user request; (B) identification of an implementation pattern which is a system configuration including a storage sub-system having a storage function required in order to achieve a function satisfying the user request received in the (A), on the basis of the request/function correspondence information and the function information; and (C) setup for achieving a function satisfying the user request received in the (A), in respect of a specified implementation pattern, which is any implementation pattern of the one or more implementation patterns identified in (B).

The user request may be received via a user interface screen (GUI (Graphical User Interface)) or may be received via another interface.

Possible examples of a user request are: the creation of an automatic expansion volume, the creation of a security volume, archiving, migration, or the like. Here, "archiving" means that a plurality of data (for example, files) in a logical volume in a storage sub-system is gathered into one data element. In this, technology for reducing the data volume while maintaining the effective quality of the data can be employed.

BRIEF DESCRIPTION OF DRAWINGS

FIG. 5 shows one example of the details of a required configuration table 4190.

FIG. 6 shows one example of the details of a restriction information 4200.

FIG. 7 shows one example of the details of a system function table 4210.

FIG. 8 shows one example of the details of a system configuration information table 4220.

FIG. 9 shows one example of the details of an implementation pattern table 4230.

FIG. 10 shows one example of the details of a characteristics table 4240.

DESCRIPTION OF EMBODIMENTS

Figure 1:
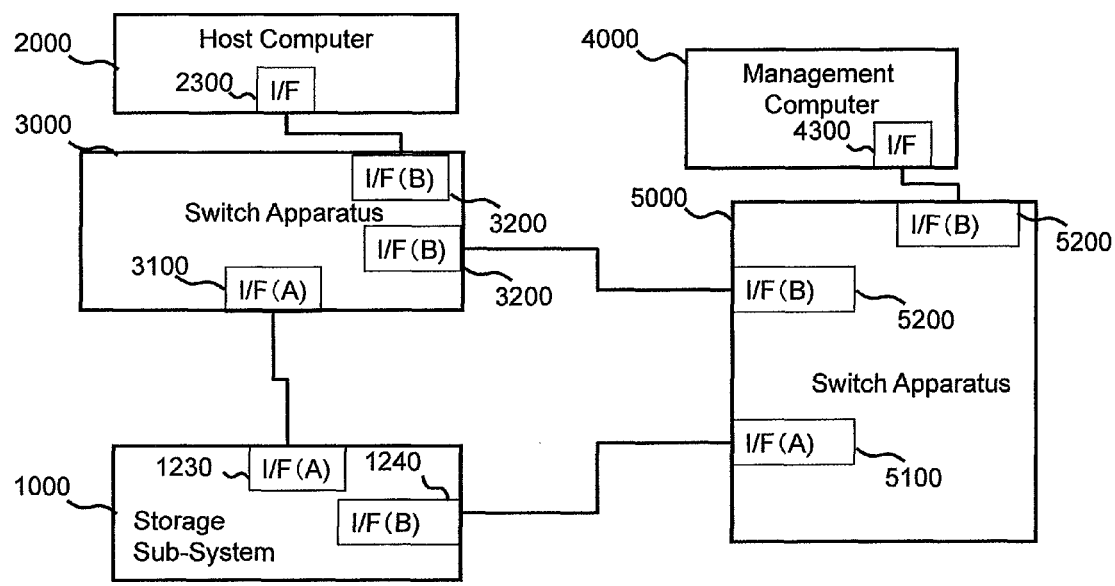
FIG. 1 is a diagram showing the composition of a computer system relating to a first embodiment of the present invention.

In one embodiment of the present invention, a management system is coupled to a computer system (for example, one or more host computers and/or one or more storage sub-systems) comprising one or more host computers (for example, host computers of a plurality of different types), and one or more storage sub-systems (for example, storage sub-systems of a plurality of different types) which are coupled to the one or more host computers. When setting a certain logical object (for example, a logical volume), the user is able to specify a configuration change request instructing a condition after a configuration change (hereinafter, change condition) to the management system. In order to satisfy the instructed change condition in accordance with a configuration change request, the management system acquires information representing the functions of the storage sub-system (hereinafter, storage function information), information representing the functions of the host computer (hereinafter, host function information), and information representing the system configuration which indicates which host computer is coupled to which storage sub-system (hereinafter, system configuration information).

The management system indicates system configuration information representing the system configuration which satisfies the user's change condition, and information representing restrictions according to that system configuration (hereinafter, called "restriction information"). The user instructs a desired system configuration to the management system on the basis of the combination of the indicated system configuration information and restriction information. The management system sets the aforementioned logical object in the apparatus corresponding to the instructed system configuration (for example, the storage sub-system in the specified system configuration).

In the following description, an ID (identifier) or number is used as information for identifying several elements, but this invention is not limited to this and identification information of another type can also be used. For example, the identification information may be information which can uniquely identify a management object, such as the model name or serial number of an storage sub-system, or the like.

Furthermore, in the description given below, a "program" may be stated as the subject of a processing action, but since a program is implemented by a processor (for example, a CPU (Central Processing Unit)) and the specified processing is carried out by suitably using storage resources (for example, a memory) and/or a communications interface processor (for example, a communications port), then a processor may be taken to be the subject of processing. Processing described with a program as the subject of the action may also be considered as processing carried out by the management system. Furthermore, a processor may include a hardware circuit which performs all or a portion of the processing carried out by the processor.

A management system may be constituted by one or more computers. More specifically, for example, if the management computer displays information, or if the management computer sends information for display to a remote computer, then the management computer is a management system. Furthermore, if functions similar to those of a management computer are achieved by means of a plurality of computers, for example, then the plurality of computers (also including a display computer if display is performed by a display computer) form a management system. In the respective embodiments described above, the management computer is taken to be a management system.

Furthermore, the data structure of the information managed by the storage sub-system and/or the management system (hereinafter, called "management information") may be a data structure such as a table as employed in the embodiment, or a hierarchical data structure such as XML. There are no particular restrictions on the data structure of the management information. Furthermore, the management information may be stored in a physical storage device (for example, a hard disk drive), or in a memory.

Next, several embodiments of the present invention will be described. The present invention is not limited to the first to third embodiments described below (or to a combination of two or more of these embodiments).

Example 1

A1. System Configuration

FIG. 1 is a diagram showing the composition of a computer system relating to a first embodiment of the present invention. In the description given below, the communications interface apparatus is abbreviated to "I/F".

This computer system comprises a storage sub-system 1000, a host computer 2000, a switch apparatus 3000, a management computer 4000 and a switch apparatus 5000.

In the drawings, there are respectively one storage sub-system 1000, one host computer 2000 and one management computer 4000, but there may also be more than one of each of these. Furthermore, although there are one switch apparatus 3000 and one switch apparatus 5000 respectively, as long as the storage sub-system 1000, the host computer 2000 and the management computer 4000 can be coupled, then it is possible not to provide any switch apparatus (in other words, zero switch apparatuses is possible).

The storage sub-system 1000 and the host computer 2000 are network coupled via a switch apparatus 3000. The storage sub-system 1000 and the management computer 4000 are network coupled via the switch apparatus 5000. The switch apparatus 3000 and the switch apparatus 5000 may be the same apparatus.

The switch apparatus 3000 comprises an I/F 3100 for coupling with the storage sub-system 1000 and an I/F 3200 for coupling with the host computer 2000. The communications protocol used here between the storage sub-system 1000 and the host computer 2000 (and communications via the switch apparatus 3000) is FC (Fiber Channel) or iSCSI, but any protocol may be used. Furthermore, in the drawings, there is one I/F 3100 and one I/F 3200, but there may be more than one of each of these.

The switch apparatus 5000 comprises an I/F 5100 for coupling with the storage sub-system 1000 and an I/F 5200 for coupling with the management computer 4000. The communications protocol used between the storage sub-system 1000 and the management computer 4000 (and communications via the switch apparatus 5000) is TCP/IP, but any protocol may be used. Furthermore, in the drawings, there is one I/F 5100 and one I/F 5200, but there may be more than one of each of these.

In the present embodiment, the switch apparatus 3000 and the switch apparatus 5000 are coupled via an I/F, but the coupling is not limited to this.

Figure 2:
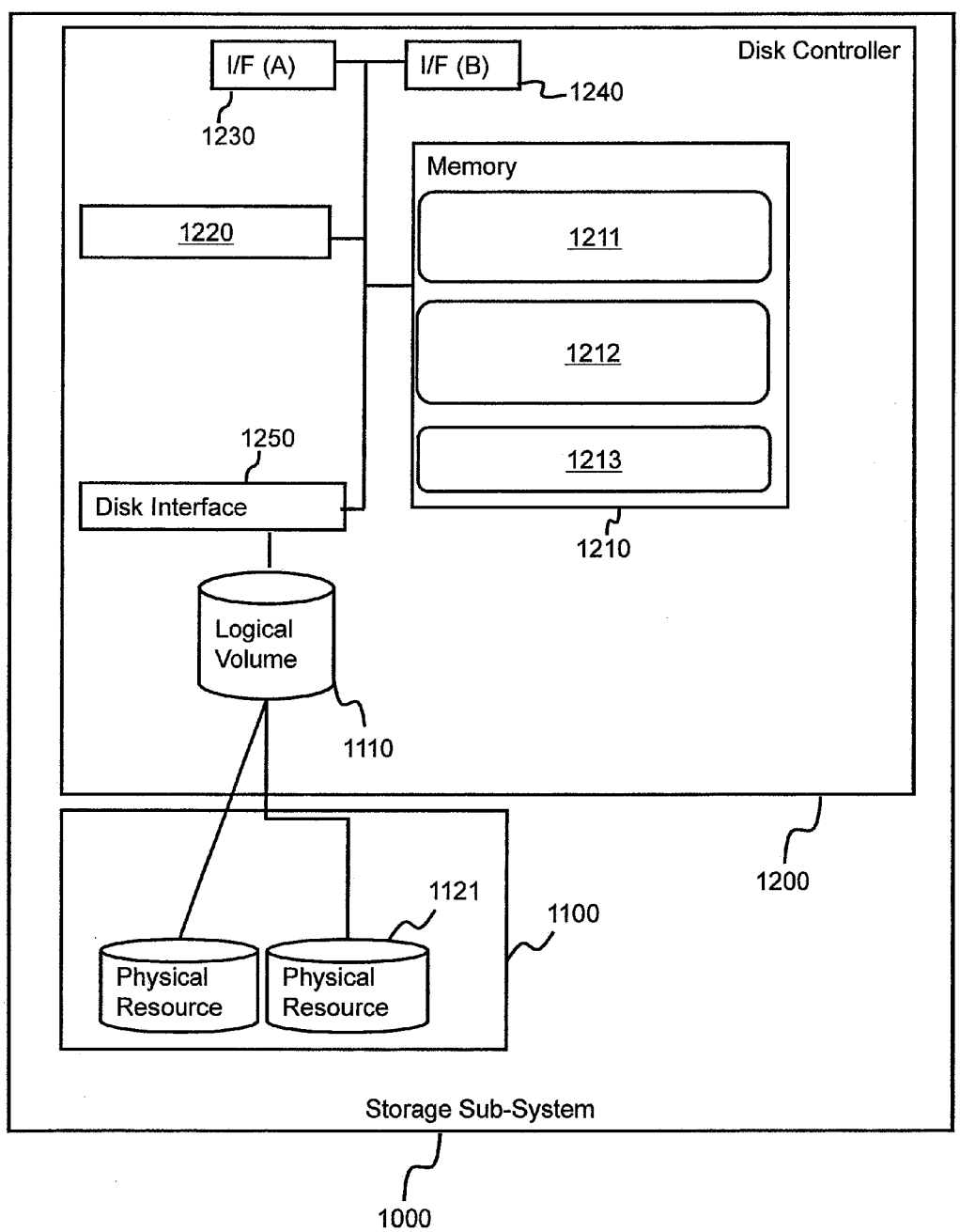
FIG. 2 shows the internal configuration of a storage sub-system 1000.

FIG. 2 shows the internal configuration of the storage sub-system 1000.

The storage sub-system 1000 comprises a disk apparatus 1100 and a disk controller 1200.

The disk apparatus 1100 has a plurality of disk type storage devices. More specifically, for example, the disk apparatus 1100 includes one or more RAID groups, and each RAID group is a group of a plurality of disk type physical storage devices based on a RAID system. A disk type storage device is, for example, a HDD (Hard Disk Drive) or an SSD (Solid State Drive). It is also possible to employ a physical storage device of another type, instead of a disk type storage device. Consequently, it is also possible to employ a controller (storage controller) capable of accessing physical storage devices of a type other than disk type storage devices, instead of the disk controller 1200.

One or more physical resources 1121 is provided on the basis of one or more RAID groups. Here, "physical resource" is a portion of a storage area belonging to a RAID group, and means a storage area spanning a plurality of physical storage devices which constitute a RAID group. There are no particular restrictions of the type of physical storage device which provides the physical resource 1121. In the drawings, there are two physical resources 1121, but the invention is not limited to this, provided that there is one or more physical resources.

The disk controller 1200 comprises a memory 1210, a control apparatus 1220, an I/F 1230 for coupling with the switch apparatus 3000, an I/F 1240 for coupling with the switch apparatus 5000, and an I/F 1250 for coupling with a physical storage device inside the disk apparatus 1100. These constituent elements are coupled together via a bus or switch, for example.

The disk controller 1200 manages a logical volume 1110. The logical volume 1110 is a logical storage device which is constituted by one or more physical resources 1121 (a logical storage area which is provided to the host computer 2000 by the disk controller 1200). The logical volume 1110 illustrated is constituted by one or a plurality of physical resources 1121 allocated previously, and the capacity of the logical volume 1110 and the total capacity of the physical resources 1121 constituting same are equal.

Here, there may be one or more than one type of logical volume 1100. For example, an automatic capacity expansion volume may be present as a logical volume 1100.

Furthermore, in the drawings, the number of logical volumes 1100 is one, but the disk controller 1200 may manage a plurality of logical volumes 1100. In the present embodiment, for the sake of the description, the disk controller 1200 is regarded as not managing automatic capacity expansion volumes, but there may be automatic capacity expansion volumes as logical volumes 1110.

The memory 1210 stores programs and data used by the control apparatus 1220. For example, the memory 1210 has a configuration acquisition program (hereinafter, configuration acquisition program) 1211, a storage function acquisition program (hereinafter, function acquisition program), and a storage setup program 1213. Examples of the functions realized by software (computer programs) and/or hardware belonging to the storage sub-system 1000, and/or software (computer program) and/or hardware belonging to the host computer 2000 include: a volume creation management function, a copying function, an automatic capacity expansion volume creation function, a security volume creation function, and the like.

The configuration acquisition program 1211 gathers configuration information including information representing the coupling relationships between the storage sub-system 1000 and the host computer 2000. The program 1211 sends this configuration information to other programs.

The function acquisition program 1212 gathers storage function information representing the functions held by the storage sub-system 1000. The program 1212 sends this storage function information to other programs.

The storage setup program 1213 specifies configuration settings for the storage sub-system 1000. The program 1213 has a function for receiving configuration change requests for the storage sub-system 1000 from the management computer 4000.

The control apparatus 1220 controls the execution of the programs inside the memory 1210, the input and output of data to and from the memory 1210, and the input and output of data and control commands via the respective interfaces (I/F) belonging to the disk controller 1200. The control apparatus 1220 is a CPU, for example.

In the present embodiment, the storage sub-system 1000 is taken to have a function of joining together a plurality of logical volumes 1110 (hereinafter called "LUSE" (Logical Unit Size Expansion)), and a function of allocating one logical volume 1110 to the host computer 2000. Furthermore, in the present embodiment, the storage sub-system 1000 has generic functions which are normally provided in a storage sub-system (for example, a function for allocating a logical volume to the host computer 2000 via the I/F (A) 1230), but for the sake of simplification, these functions are not depicted.

In the present embodiment, functions which affect the object settings desired by the user may be called "particular functions" in order to distinguish them from generic functions of this kind. For instance, the particular functions are the functions represented by the information stated in the table shown in FIG. 5.

The storage sub-system 1000 may also comprise an input apparatus for the user of the storage sub-system 1000 to input data, and an output apparatus for presenting information to the user of the storage sub-system 1000, but these are not depicted.

Figure 3:
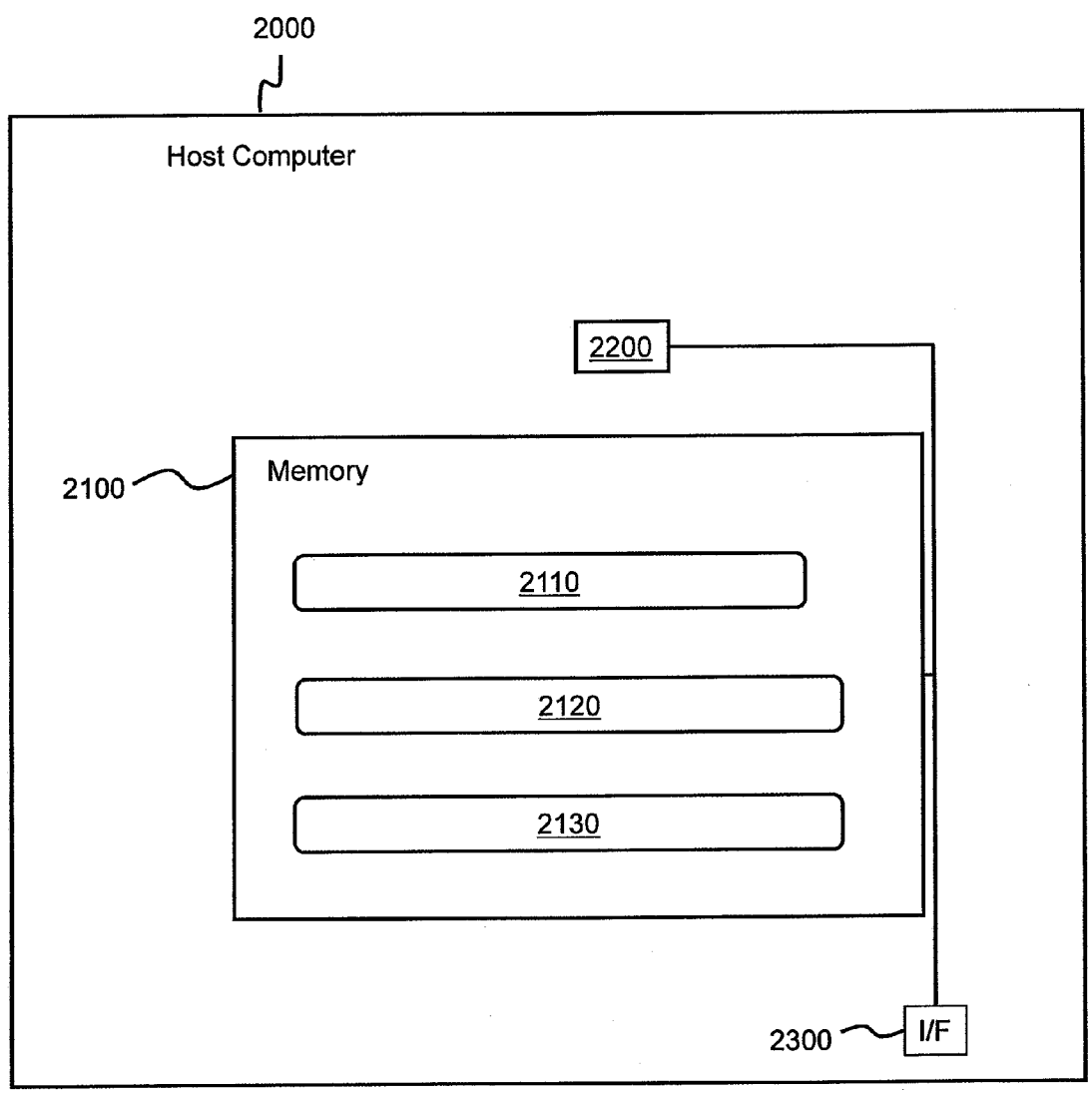
FIG. 3 shows the internal configuration of a host computer 2000.

FIG. 3 shows the internal configuration of the host computer 2000.

The host computer 2000 comprises a memory 2100, a control apparatus 2200, and an I/F 2300 for coupling to the switch apparatus 3000. These constituent elements are coupled together via a bus or switch, for example.

The memory 2100 stores programs and data used by the control apparatus 2200. For example, the memory 2100 stores a business application 2110, an operating system 2120, and a host setup program 2130.

The business application 2110 is a program held by the host computer 2000, and may be an application program of any kind.

The operating system 2120 comprises the following elements, for example:
 information relating to the devices belonging to the host computer 2000 (for instance, the control apparatus (such as a CPU) 2200, the memory 2100, I/F 2300), (hereinafter, devices H);
 a function for controlling the devices H;
 a function for acquiring information (characteristics information) indicating the characteristics of the devices H;
 a function for acquiring device H function information indicating the functions of the devices H;
 a function for managing data recorded in the storage sub-system (hereinafter, called "a file system function"); and
 a function for acquiring application function information indicating the functions of the business application 2110.

In the present embodiment, in order to simplify the description, all of these functions are included in the operating system, but at least one of these functions may be held by the host computer 2000 as a separate program from the operating system. Furthermore, the operating system 2120 may have a function for managing the devices H virtually, a virtual server management function which runs on the operating system 2120, a user management function, and the like. The virtual server management function may, for example, be held by a hypervisor running on the operating system.

The host setup program 2130 receives input values from other programs and instructs device settings to the operating system 2120 in accordance with these input values.

The control apparatus 2200 controls the execution of programs in the memory 2100, the input and output of data to and from the memory 2100, and the input and output of data or control commands via the I/F 2300.

In the present embodiment, the functions held by the operating system of the host computer 2000 may include a function capable of creating an automatic capacity expansion volume. The method of creating and managing the volume on the operating system is a commonly known method, and therefore description thereof is omitted here. Furthermore, the host computer 2000 may include an input apparatus for the user to input data, or an output apparatus for presenting information to the user of the host computer 2000, but these are not depicted.

Figure 4:
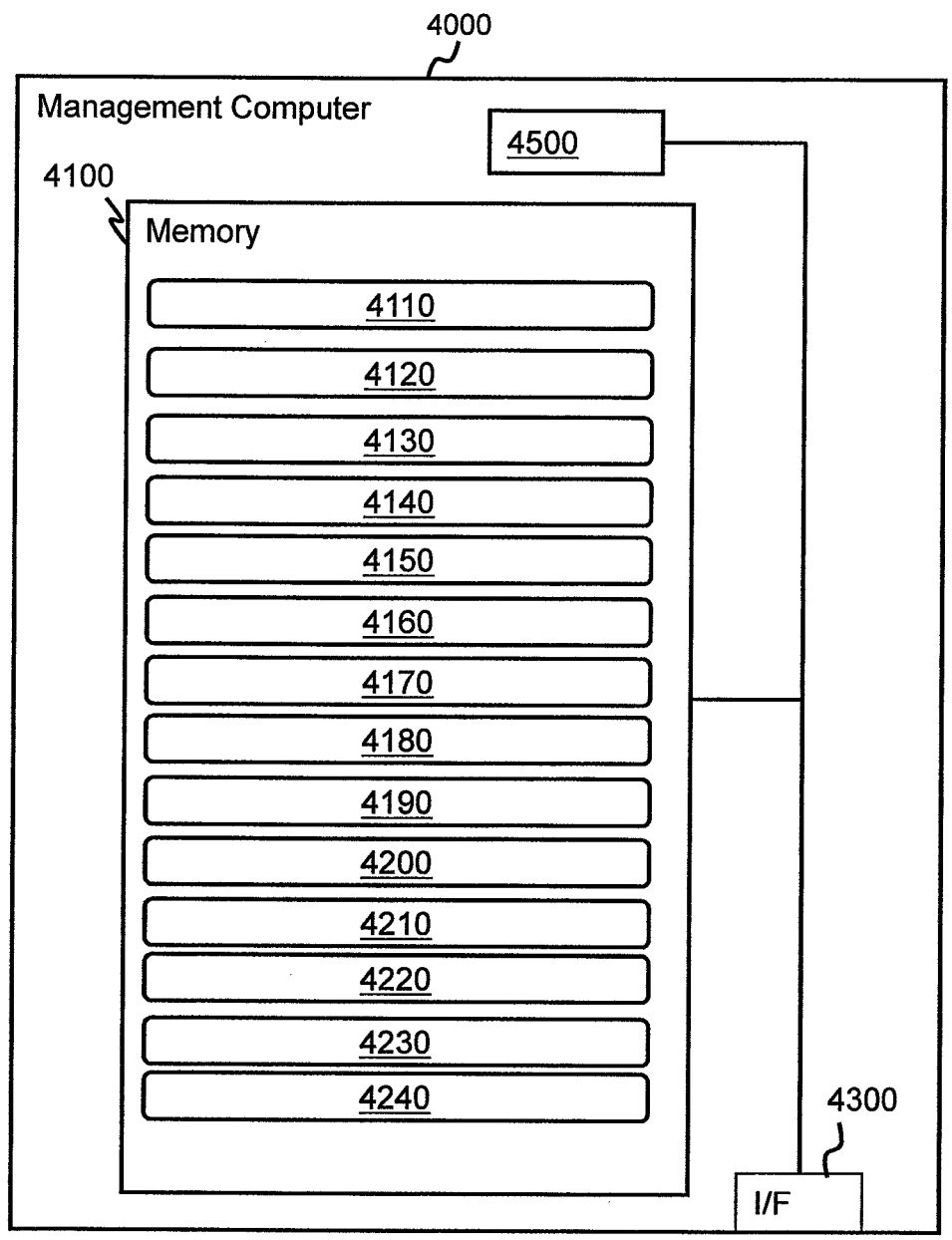
FIG. 4 shows the internal configuration of a management computer 4000.

FIG. 4 shows the internal configuration of the management computer 4000.

The management computer 4000 comprises a memory 4100, a control apparatus 4500, and an I/F 4300 for coupling to the switch apparatus 5000. The memory 4100 stores programs and data used by the control apparatus 4500. The memory 4100 includes, for example, a configuration management program 4110, a function management program 4120, an implementation pattern acquisition program 4130, a characteristics monitoring program 4140, an implementation pattern specification program 4150, a matching configuration detection program 4160, a restriction information addition program 4170, a system setup program 4180, a required configuration table 4190, a restriction information table 4200, a system function table 4210, a system configuration information table 4220, an implementation pattern table 4230, and a characteristics table 4240.

The configuration management program 4110 acquires storage configuration information representing the configuration of the storage sub-system 1000 and host configuration information representing the configuration of the host computer 2000. The program 4110 stores the acquired storage configuration information and host configuration information in the system configuration information table 4220. The configuration management program 4110 may include a function for acquiring storage configuration information (a function for acquiring storage configuration information by communicating with the configuration information acquisition program 1211 of the storage sub-system 1000), and a function for acquiring host configuration information (a function for acquiring host configuration information by communicating with the operating system 2120 of the host computer 2000). In the present embodiment, in order to simplify the description, only the information relating to the coupling relationship between the storage sub-system 1000 and the host computer 2000 (the system configuration information) is acquired, and this system configuration information is stored in the system configuration information table 4220. However, information other than this may also be acquired. For example, information indicating the free capacity of the logical volume 1110 belonging to the storage sub-system 1000 may also be acquired, and information indicating whether or not a logical volume 1110 has been allocated to the host computer 2000 may also be acquired. The configuration management program 4110 may also comprise a function for generating a logical volume 1110 from a physical resource 1121, a function for allocating a logical volume to a host computer 2000 via the I/F (A) 1230, and a scheduler function for carrying out specific processing at specific times.

The management program 4120 acquires storage function information and host function information, and stores this information in the system function table 4210. The function management program 4120 acquires, in particular, storage function information by communicating with the function acquisition program 1212 of the storage sub-system 1000. Moreover, the function management program 4120 acquires host function information by communicating with the business application 2110 or the operating system 2120 in the host computer 2000. Apart from this, the function management program 4120 may also include a scheduler function which carries out specific processing at specific times, and may present an input interface for adding functional information about the storage sub-system 1000 and the host 2000, to the user.

The implementation pattern acquisition program 4130 acquires system configuration information (information indicating the coupling relationship between the storage sub-system 1000 and the host computer 2000), from the system configuration information table 4220. Furthermore, the program 4130 acquires storage function information and host function information from the system function table 4210 and extracts the functions which can be implemented.

The characteristics monitoring program 4140 acquires characteristics information for the storage sub-system 1000 and characteristics information for the devices H belonging to the host computer 2000, from the configuration acquisition program and the operating system 2120, and stores this information in a characteristics table. In the present embodiment, in order to simplify the description, the devices H which are the object of characteristics monitoring are ports (the ports belonging to the I/F 2300), but devices H of other types may also be characteristics monitoring objects. The characteristics monitoring program 4140 may acquire at least one of the following as characteristics information for the storage sub-system 1000 and/or characteristics information for the devices H:

- information indicating the capacity of the logical volume 1110 belonging to the storage sub-system 1000;
- information indicating the I/O frequency for the logical volume 1110 (the unit of I/O frequency is, for example, IOPS (Input Output Per Second);
- information indicating the operating rate of the CPU (control apparatus) of the storage sub-system 1000 and/or the host computer 2000; and
- information indicating the free capacity of the memory of the storage sub-system 1000 and/or the host computer 2000. The acquired information of any type may be stored in the characteristics table 4240.

The implementation pattern specification program 4150 specifies a system configuration which satisfies the change condition (condition after configuration change) instructed by the user, and sends information indicating the specified system configuration to the system setup program 4180.

In the present embodiment, a user configuration change request (hereinafter, called "user request") is a request for a configuration change instructed by the user (for example, a logical volume capacity expansion, back-up, archiving or encryption). Of the one or more system configurations corresponding to a user request, a system configuration corresponding to restriction information which matches the change condition is not regarded as a system configuration capable of implementing the user request (for example, such a configuration is excluded from the system configuration options which can be selected by the user). For instance, if the user request is for creation of an automatic capacity expansion volume, then one example of a change condition is that size reduction is possible (in other words, allocation of a storage area corresponding to the automatic capacity expansion volume can be released dynamically). In this case, a system configuration associated with restriction information indicating the disabling of size reduction is not regarded as a system configuration capable of implementing the user request.

In the present embodiment, a user inputs a user request and change condition via a user request UI (User Interface) screen (UI1100) (see FIG. 15) provided by the implementation pattern specification program. Upon receiving this input, the implementation pattern specification program 4150 sends the information (information indicating the user request and the change condition) to the matching configuration detection program 4160. The implementation pattern specification program 4150 receives system configuration candidates which satisfy the input user request and change condition, from the matching configuration detection program 4160, and displays these candidates on the configuration specification UI screen (UI2100) (see FIG. 16). The user then selects a system configuration from the configuration specification UI screen (UI 2100). When a system configuration has been selected, the implementation pattern specification program 4150 sends information indicating the selected system configuration to the system setup program 4180. The method of selecting the system configuration is not limited to this and may employ another method. For example, the implementation pattern specification program may automatically select a system configuration and send information indicating the selected system configuration to the system setup program 4180.

The matching configuration detection program 4160 receives information indicating the user request and change condition from the implementation pattern specification program 4150. Furthermore, this program 4160 sends information indicating a system configuration which satisfies the user request and the change condition to the restriction information addition program 4170. Moreover, the program 4160 identifies a system configuration that can be implemented, on the basis of the implementation pattern table 4230, and sends information indicating the identified system configuration to the implementation pattern specification program 4150.

The restriction information addition program 4170 associates restriction information with the system configuration which is represented by the information received from the matching configuration detection program 4160. In the present embodiment, in order to simplify the description, if a host computer 2000 has no prescribed particular functions, then restriction information indicating a restriction such as "capacity expansion disabled when on" (which means that the host computer 2000 is not able to recognize the capacity of an automatic capacity expansion volume after capacity expansion, without the host computer 2000 being restarted) is associated with the system configuration which includes that host computer 2000. The contents of the restriction information vary depending on the type of the particular function. For instance, it is also possible to associate restriction information stating "decline in system reliability" and/or "little free capacity upon capacity expansion", on the basis of the number of switch apparatuses 3000 interposed between the storage sub-system 1000 and the host computer 2000 and/or the free capacity of the physical resource of the storage sub-system 1000. In other words, the restriction information can be specified on the basis of at least one of (A) to (C) below.
(A) at least one of the functions, configuration and status of the storage system (for example, the free capacity of the physical resource);
(B) the functions, configuration and status of the host computer which is coupled to the storage system; and
(C) the number of switch apparatuses interposed between the storage system and the host computer coupled to the storage system.

The system setup program 4180 receives information indicating the system configuration specified by the implementation pattern specification program 4150 (including information indicating a logical object to be set) and sets up a logical object corresponding to that information. The system setup program 4160 can set up a logical object by starting up the storage setup program 1213 and/or the host setup program 2130.

FIG. 5 shows one example of the details of a required configuration table 4190.

The required configuration table 4190 is a table which stores information indicating a user request and information about the functions of the storage sub-system 1000 and the host computer 2000 which are required to satisfy the user request. The required function table 4190 includes the following information, for example, for each user request:

user request 41901 indicating the user request;
  function ID 41902, which is an identifier of a function satisfying the user request;
  function name 41903, which is a name of a storage function (storage sub-system function) and/or a host function (function of host computer) required to achieve a function satisfying the user request; and
  target system 41904, which is the name or ID of a type of storage sub-system having a storage function required to achieve a function satisfying the user request, or the name or ID of a type of host computer having a host function required to achieve this function.

The text string forming the function ID 41902 may be any string, provided that it is able to represent uniquely the user request 41901, the function name 41903 and the target system 41904. Furthermore, the text string forming the function name 41903 is not limited to the text strings in the drawings, and may be any string which is capable of identifying the relevant function. This applies similarly to information of at least one type in at least one table. Here, the type of host computer may be specified by at least one of the vendor, functions, configuration and characteristics of the host computer.

FIG. 6 shows one example of the details of a restriction information table 4200.

The restriction information table 4200 is a table which stores information representing restrictions (restriction information) which is attached to the function being implemented. The restriction information table 4200 includes, for example, the following information for each function:

function ID 42001, which is a function identifier;
  restriction 42002, which is information indicating a restriction corresponding to the function; and
  implementation pattern ID 42003, which is an identifier of the system configuration corresponding to the restrictions and function.

The table 4190 shown in FIG. 5 and the table 4200 shown in FIG. 6 contain information that has been prepared previously, for example.

Here "restriction" means a function and/or characteristic which cannot be displayed when implementing a function in accordance with a user request.

The following can be deduced from the table 4190 shown in FIG. 5 and the table 4200 shown in FIG. 6.

More specifically, for example, it can be seen that there are four types of functions which correspond to the user request "automatic capacity expansion".

The function indicated by the function ID "TP1" is a generic Thin Provisioning function also known as "dynamic provisioning". A storage sub-system having a function indicated by the function name "HDP" which corresponds to the function ID "TP1" is able to carry out the following processing. More specifically, a storage sub-system of this type is able to include a pool (group of actual pages) constituted by a plurality of actual pages (actual storage areas), and an automatic capacity expansion volume constituted by a plurality of virtual pages (virtual storage areas). Upon receiving a write command instructing an address in an automatic capacity expansion volume or an address belonging to a virtual page, the storage sub-system is able to allocate an actual page to that virtual page and write data corresponding to the write command, to the actual page. Furthermore, the storage sub-system is also able to release the actual page dynamically from the automatic capacity expansion volume (in other words, to reduce the size (capacity) of the automatic capacity expansion volume). The actual page is a storage area which is smaller than the physical resource. There are no particular restrictions on the function ID "TP1" (see FIG. 6).

The function indicated by the function ID "TP2" is achieved by coordinated operation of the storage sub-system having the function indicated by the function name "LUSE" and the host computer which has a function indicated by the function name "Windows" ("Windows" is a registered tradename). Detailed description of the actual implementation of a function similar to generic Thin Provisioning by coordinated operation of the storage sub-system and the host computer is omitted here. According to the function ID "TP2", there are the following restrictions:

"Size reduction disabled": a restriction which means that the size of an automatic capacity expansion volume cannot be reduced dynamically;
  "Read-only prohibited": a restriction which means that read only access to the data in the automatic capacity expansion volume is prohibited (a "read only" access attribute cannot be set for the automatic capacity expansion volume).

The function indicated by the function ID "TP3" is implemented by a storage sub-system having a function indicated by the function name "LUSE".

The function indicated by the function ID "TP4" is implemented by a host computer having a function indicated by the function name "ZFS". According to the function ID "TP4", an automatic capacity expansion function is provided even if the storage sub-system does not have an automatic capacity function.

In this way, there are a plurality of functions which can satisfy one user request. However, certain functions of the plurality of functions may have restrictions which other functions of the plurality of functions do not have. The restriction may be a restriction which is determined uniquely on the basis of the functions of the storage sub-system, the functions of the host computer, or a combination of these (namely, a static restriction). Furthermore, the restriction may also be determined on the basis of the status (such as the performance (load)) of the devices belonging to the storage sub-system (for example, ports, CPU, memory, logical volume or physical resource), the status (such as the performance (load)) of the devices belonging to the host computer (for example, the I/F, CPU or memory), or a combination of these (namely, a dynamic restriction).

FIG. 7 shows one example of the details of a system function table 4210.

The system function table 4210 is a table which stores information representing the functions held by the respective apparatuses, such as the storage sub-system 1000 or the host computer 2000. The system function table 4210 includes, for example, the following information for each apparatus:

system ID 42101 which is an identifier of the apparatus (for example, the storage sub-system 1000 or host computer 2000); and
  function name 42102 which is a name of a function held by the apparatus.

FIG. 8 shows one example of the details of a system configuration information table 4220.

The system configuration information table 4220 is a table which stores information indicating the coupling relationship (system configuration) between the storage sub-system 1000 and the host computer 2000. For each system configuration, the system configuration information table 4220 includes, for example:

a storage sub-system ID 42201 which is an identifier of a storage sub-system 1000 in the system configuration;

a LUN (Logical Unit Number) 42202 which is one type of identifier of a logical volume 1110; and a host ID 42203 which is an identifier of a host computer 2000 in the system configuration (a host computer which is coupled to the storage sub-system and which recognizes the logical volume).

FIG. 9 shows one example of the details of an implementation pattern table 4230.

The implementation pattern table 4230 is a table which stores information indicating system configurations corresponding to user requests. For each system configuration, the implementation pattern table 4230 includes, for example, the following information:

implementation pattern ID 42301 which is an identifier of an implementation pattern corresponding to the system configuration;

user request 42302 indicating a user request corresponding to the system configuration;

storage ID 42303 which is an identifier of a storage sub-system 1000 in the system configuration;

host ID 42304 which is an identifier of a host computer 2000 in the system configuration;

function ID 42305, which is an identifier of a function that can be implemented by the system configuration; and implementation enabled/disabled 42306 which indicates whether implementation of the system configuration is enabled or disabled.

The implementation enabled/disabled element 42306 stores information indicating "enabled" in the case of a composition which can be implemented, and stores information indicating "disabled" in the case of a composition which cannot be implemented, but the implementation enabled/disabled information can also be expressed by numbers or other text characters.

FIG. 10 shows one example of the details of a characteristics table 4240.

The characteristics table 4240 is a table which stores information indicating the characteristics of the devices in the storage sub-system 1000 (hereinafter, called "devices S") and/or information indicating the characteristics of the devices H (the devices inside the host computer). The characteristics information table 4240 includes the following information, for example, for each characteristic detected:

system ID 42401 which is an identifier of an apparatus (storage sub-system 1000 or host computer 2000) having a device having the characteristic;

device 42402 indicating the name of the device having the characteristic;

time 42403 indicating the characteristic acquisition time or acquisition time band; and IOPS 42404 indicating the I/O frequency as a characteristic.

The devices which are the object of characteristics monitoring are not limited to network interfaces (for example, host bus adapters (HBA), ports) and may include other types of device (hardware), for example, CPUs or memories.

A-2. Description of Data Processing Procedure

The data processing procedure in the present embodiment is now described.

Figure 11:
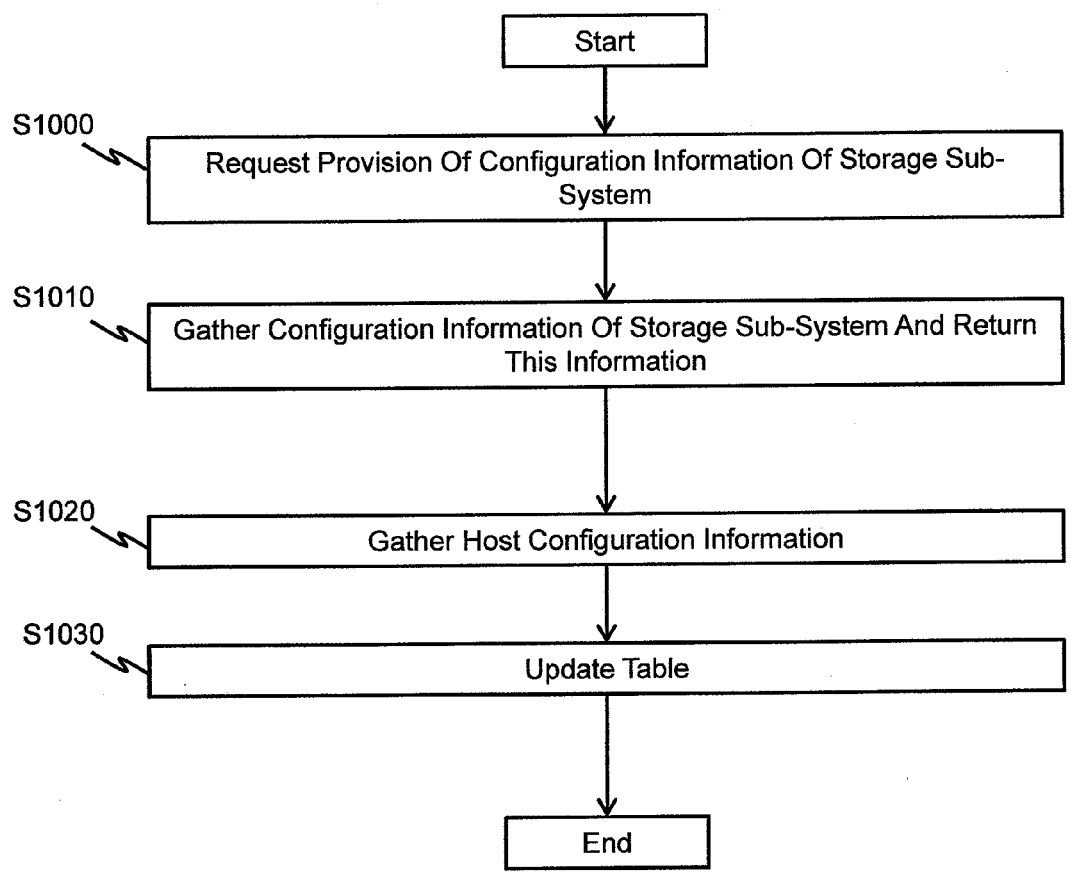
FIG. 11 shows a flowchart of processing executed by a configuration management program 4110.

FIG. 11 shows a flowchart of processing executed by the configuration management program 4110.

In step S1000, the configuration management program 4110 requests provision of configuration information of the storage sub-system 1000, from the configuration acquisition program 1211. In response to this request, the configuration acquisition program 1211 gathers configuration information of the storage sub-system 1000 on the basis of the management information held by the storage sub-system 1000 (for example, information relating to the logical volume, such as the LUN and capacity). The management information is stored in the memory 1210 of the storage sub-system 1000, for example.

In step S1010, the configuration management program 4110 receives configuration information of the storage sub-system 1000 (the information gathered as described above), from the configuration acquisition program 1211. This configuration information is information stored in the system configuration information table 4220, but other types of information can also be received in addition to this.

In step S1020, the configuration management program 4110 receives configuration information of the host computer 2000 from the operating system 2120, by communicating with the operating system of the host computer 2000. In the present embodiment, the configuration information received from the operating system 2120 is information stored in the system configuration information table 4220, but other types of information can also be received in addition to this. Furthermore, configuration information is not limited to being acquired from the operating system, and it is also possible to provide a program for acquiring configuration information in the host computer 2000 and to receive configuration information from this program.

In step S1030, the configuration management program 4110 stores the configuration information received at S1010 and the configuration information received at S1020, in the system configuration information table 4220.

The configuration management program 4110 may start the flow shown in FIG. 11 at prescribed time intervals, for example, or may start the flow shown in FIG. 11 when a change in the storage sub-system or the host computer (or the system configuration in which these are combined) is detected. In a case where the flow shown in FIG. 11 is started at prescribed time intervals, information indicating the time interval for starting the flow shown in FIG. 11 may be set by the user in the memory of the management computer 4000. This time interval may be fixed or modifiable.

The system configuration information table 4220 is created or updated by carrying out processing in accordance with the flow shown in FIG. 11.

Figure 12:
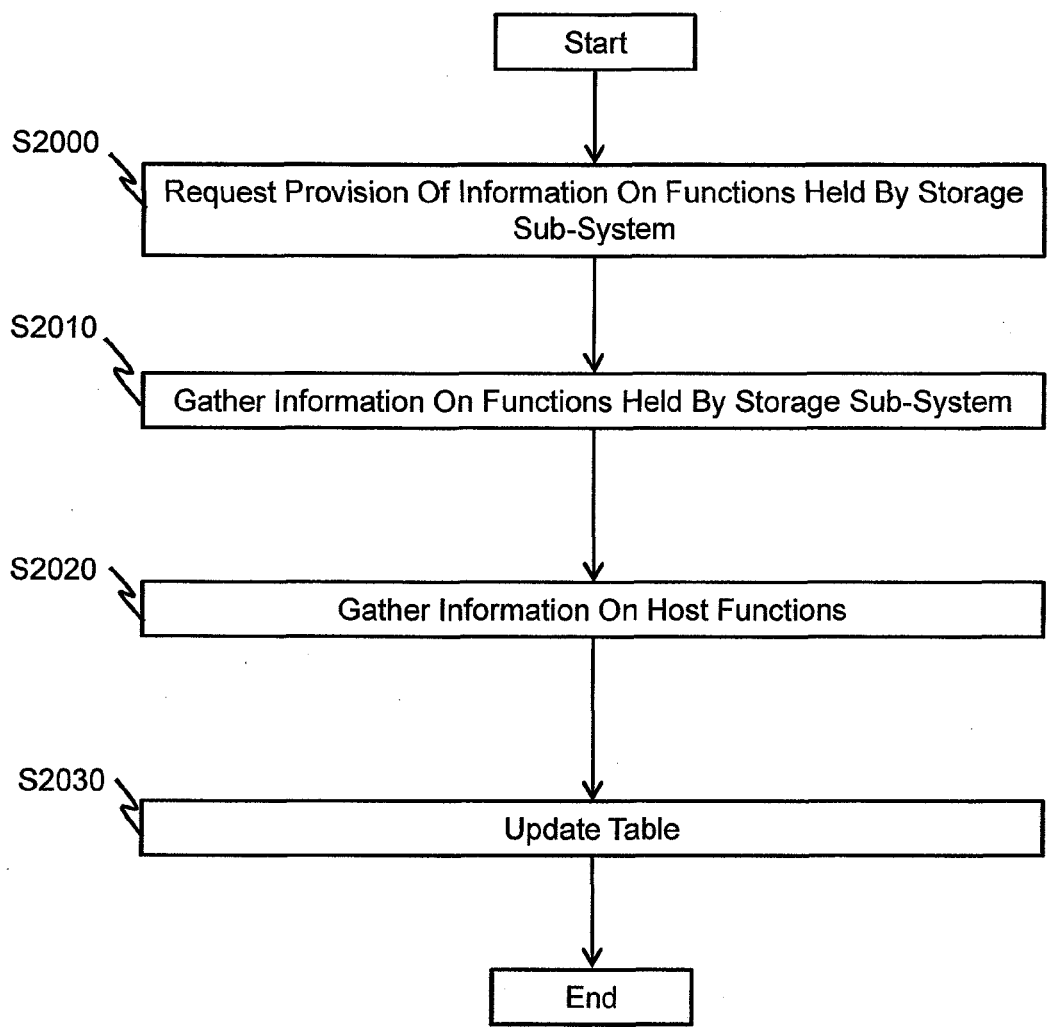
FIG. 12 shows a flowchart of processing executed by a function management program 4120.

FIG. 12 shows a flowchart of processing executed by the function management program 4120.

In step S2000, the function management program 4120 requests the function acquisition program 1212 to provide information indicating the functions of the storage sub-system 1000 (storage function information). In response to this request, the function acquisition program 1211 gathers storage function information on the basis of the management information held by the storage sub-system 1000.

In step S2010, the configuration management program 4120 receives storage function information (the information gathered as described above), from the function acquisition program 1212.

In step S2020, the function management program 4120 receives information indicating the functions of the host computer 2000 (host function information) from the business application 2110 and/or the operating system 2120, by communicating with the business application 2110 and/or the operating system 2120. In the present embodiment, in order to simplify the description, it is supposed that the function information is gathered separately from the business application 2110 and from the operating system 2120, but it is also possible to gather information via a specific interface of the host computer 2000 (an interface which provides host function information).

In step S2030, the function management program 4120 stores the storage function information received at S2010 and the host function information received at S2020, in the system function table 4210.

The function management program 4120 may start the flow shown in FIG. 12 at prescribed time intervals, for example, or may start the flow shown in FIG. 12 when a change in the storage sub-system or the host computer (or the system configuration in which these are combined) is detected. In a case where the flow shown in FIG. 12 is started at prescribed time intervals, information indicating the time interval for starting the flow shown in FIG. 12 may be set by the user in the memory of the management computer 4000. This time interval may be fixed or modifiable.

The system function table 4210 is created or updated by carrying out processing in accordance with the flow shown in FIG. 12.

Figure 13:
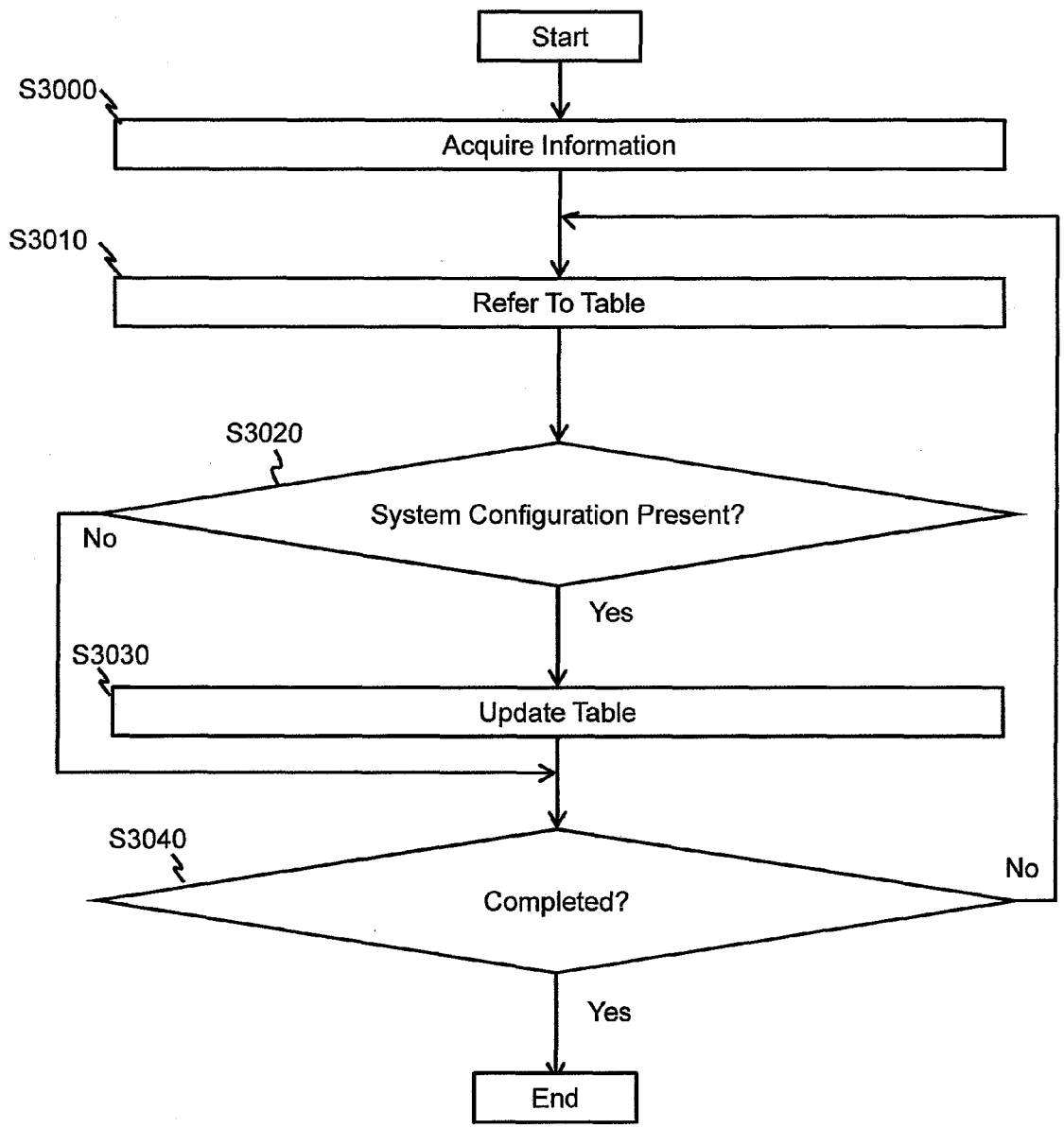
FIG. 13 shows a flowchart of processing executed by an implementation pattern acquisition program 4130.

FIG. 13 shows a flowchart of processing executed by the implementation pattern acquisition program 4130.

In step S3000, the implementation pattern acquisition program 4130 acquires information indicated by the required configuration table 4190. Steps S3010 to S3040 are carried out in respect of each function ID 41902 included in this information. Below, one function ID (the "object function ID" in the description of FIG. 13) 41902 is taken as an example to describe the steps S3010 to S3040.

At step S3010, the implementation pattern acquisition program 4130 searches for a system configuration corresponding to the object function ID 41902 by referring to the system function table 4210 and the system configuration information table 4220. For example, the following processes are carried out.

(a1) The implementation pattern acquisition program 4130 extracts one or more function name 41903 and one or more target system 41904 corresponding to the objection function ID 41902, from the information acquired at step S3000.

(a2) Next, the implementation pattern acquisition program 4130 searches for one or more system ID 42101 and one or more function name 42102 which matches the one or more target system 41904 and the one or more function name 41903 extracted in (a1) above, from the system functions information table 4210.

(a3) If the corresponding one or more system ID 42101 and one or more function name 42102 are found in (a2) above, the implementation pattern acquisition program 4130 searches the system configuration information table 4120 for a system configuration matching the one or more system ID 42101 thus found (a storage sub-system ID 42201 and/or host ID 42203).

However, the processing in step S3010 is not limited to (a1) to (a3) above, and may involve any processing capable of identifying a system configuration which matches the information indicated by the required composition table 4190, of the combination of storage sub-systems 1000 and host computers 2000 under the management of the management computer 4000.

In step S3020, the implementation pattern acquisition program 4130 judges whether or not a system configuration has been found in step S3010. If the result of this judgment is negative, then step S3040 is carried out, and if the result of this judgment is positive, then step S3030 is carried out.

In step S3030, the implementation pattern acquisition program 4130 stores a storage ID 42303 and host ID 42304 corresponding to the system configuration thus found, the function ID 42305 matching the object function ID 41902, and the implementation pattern ID 42301, in the implementation pattern table 4230. If a function ID 42305 matching the object function ID 41902 has already been stored in the implementation pattern table 4230, then the storage ID 42303 and the host ID 42304 corresponding to the found system configuration described above are appended as a record corresponding to the function ID 42305.

In step S3040, the implementation pattern acquisition program 4130 judges whether or not the processing from S3010 onwards has been completed in respect of all of the function IDs 41902 of the required configuration table 4190. If the result of this judgment is positive, then the flow shown in FIG. 13 terminates, whereas if the result of this judgment is negative, then the processing from S3010 onwards is carried out in respect of the other function IDs 41902.

The implementation pattern acquisition program 4130 may start the flow shown in FIG. 13 at prescribed time intervals, for example, or may start the flow shown in FIG. 13 when a change in the storage sub-system or the host computer (or the system configuration in which these are combined) is detected. In a case where the flow shown in FIG. 13 is started at prescribed time intervals, information indicating the time interval for starting the flow shown in FIG. 13 may be set by the user in the memory of the management computer 4000. This time interval may be fixed or modifiable.

By implementing processing in accordance with the flow shown in FIG. 13, an implementation pattern ID 42301, a storage ID 42303, a host ID 42304 and a function ID 42305 are stored in the implementation pattern table 4230, if there is a corresponding system configuration, in respect of all of the function IDs 41903 stored in the required configuration table 4190.

Figure 14:
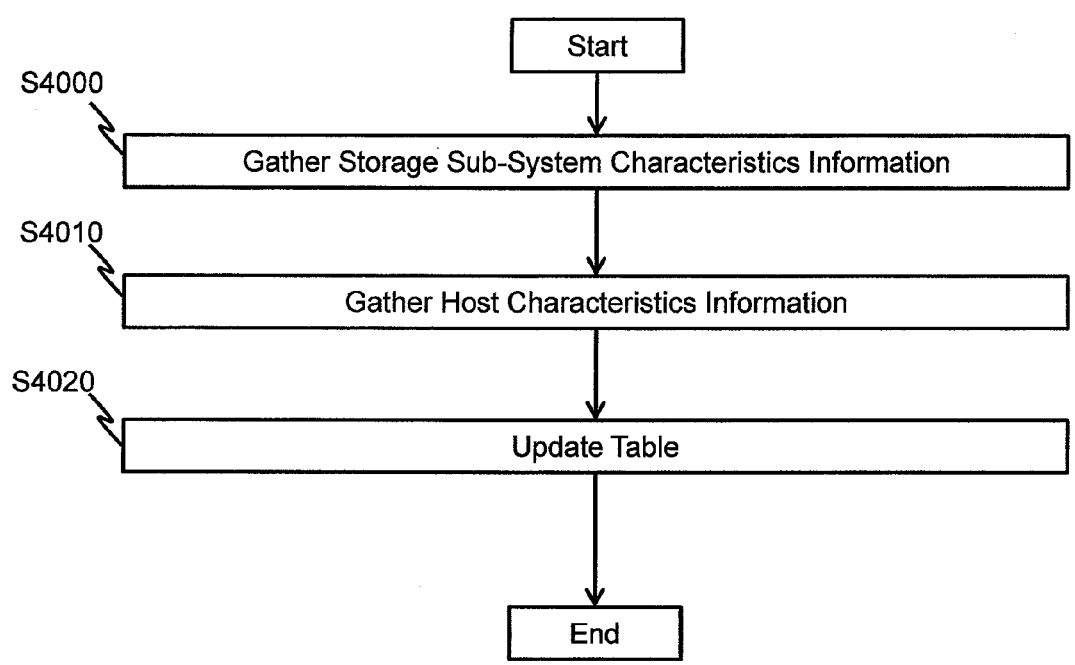
FIG. 14 shows a flowchart of processing executed by a characteristics monitoring program 4140.

FIG. 14 shows a flowchart of processing executed by the characteristic monitoring program 4140.

In step S4000, the characteristics monitoring program 4140 gathers the characteristics information for the respective devices of the storage sub-system 1000 (the devices S which are the characteristics monitoring objects) at desired time intervals. The time interval at which the characteristics information for the devices S is received may be specified by the characteristics monitoring program 4140 or may be specified by the user. Furthermore, the method of receiving the characteristics information for the devices S may be a method whereby the characteristics monitoring program 4140 sends a characteristics information acquisition request to the storage sub-system 1000 at desired time intervals, or may employ another method.

In step S4010, the characteristics monitoring program 4140 gathers characteristics information for the devices of the host computer 2000 (the devices H), at desired intervals. The interval at which the characteristics information for the devices H is received may be specified by the characteristics monitoring program 4140 or may be specified by the user. Furthermore, the method of receiving the characteristics information for the devices H may be a method whereby the characteristics monitoring program 4140 sends a characteristics information acquisition request to the operating system 2120 of the host computer 2000 at desired time intervals, or may employ another method.

In step S4020, the characteristics monitoring program 4140 stores the characteristics information gathered in S4000 and S4010, in the characteristics table 4240.

The characteristics monitoring program 4140 may restart the flow after waiting for a prescribed period of time from the completion of the flow shown in FIG. 14, or may start the flow shown in FIG. 14 upon receiving a manual request from the user. In a case where the flow is starting after waiting for a prescribed period of time, information indicating the length of the waiting time period may be set by the user in the memory of the management computer 4000. This waiting time period may be fixed or modifiable.

In the present embodiment, in order to simplify the description, the characteristics monitoring program 4140 gathers information stored in the characteristics table 4240, from the storage sub-system 1000 and the host computer 2000, but if other information is required in the characteristics table 4240, then this other information may also be gathered. Furthermore, if an interface gathering characteristics information is prepared in the storage sub-system 1000 and the host computer 2000, the characteristics monitoring program 4140 may acquire characteristics information via this interface or may acquire characteristics information by another method.

Figure 15:
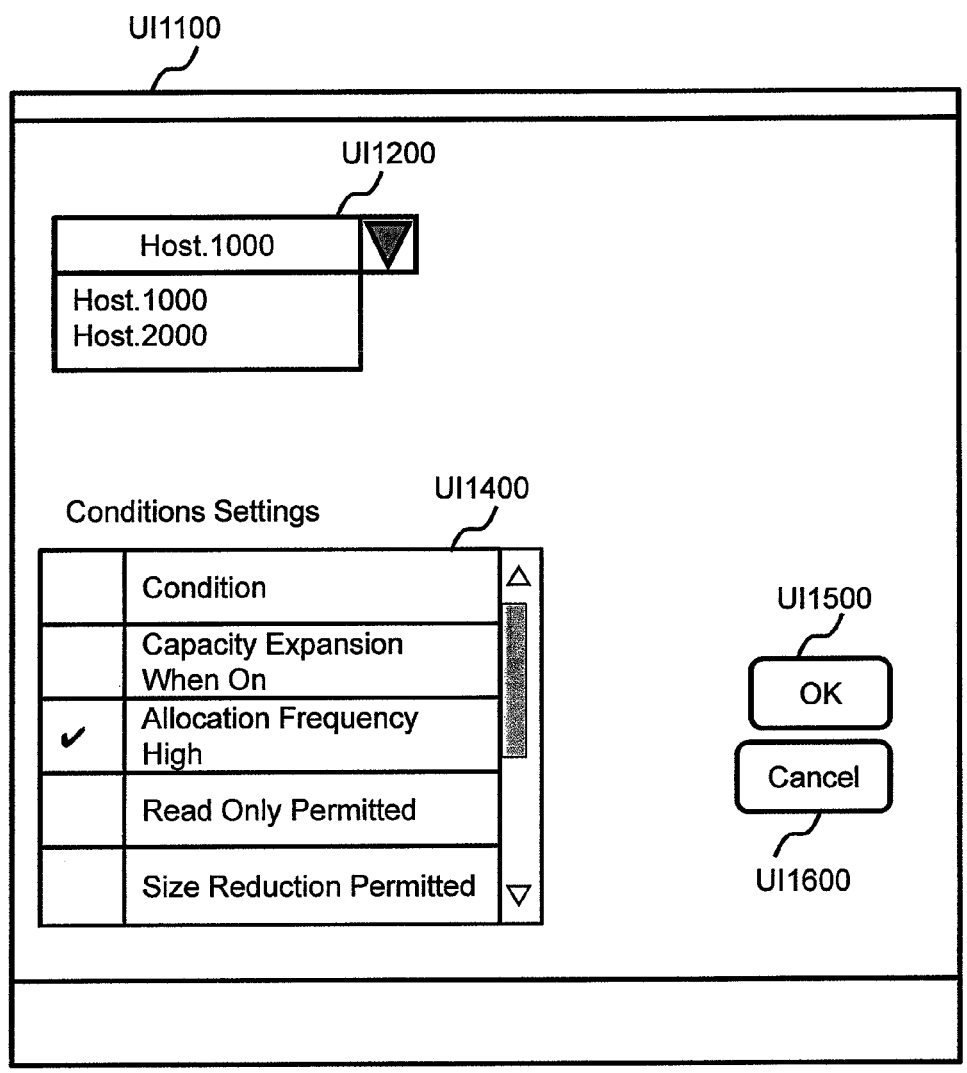
FIG. 15 shows one example of the details of a user request UI screen (UI 1100).

FIG. 15 shows one example of the details of the user request UI screen (UI 1100).

The screen (UI 1100) is a UI screen which is presented by the implementation pattern specification program 4150 (a UI screen for setting a user request and change condition). The screen (UI 1100) comprises the following tools, for example:
- a tool for selecting a host computer 2000 (for example, a drop-down box) (UI 1200);
- a tool for setting change condition (for example, a conditions settings table) (UI 1400);
- a tool for displaying system configuration candidates (for example, a button) (UI 1500); and
- a tool for deleting settings from the screen (UI 1100) (for example, a button) (UI 1600).

The conditions settings table (UI 1400) includes, for each change condition, a check box and a text string indicating a change condition. A user selects one or more change condition by inputting a check mark in one or more check box corresponding to one or more change condition, as desired, of the plurality of change conditions.

Figure 16:
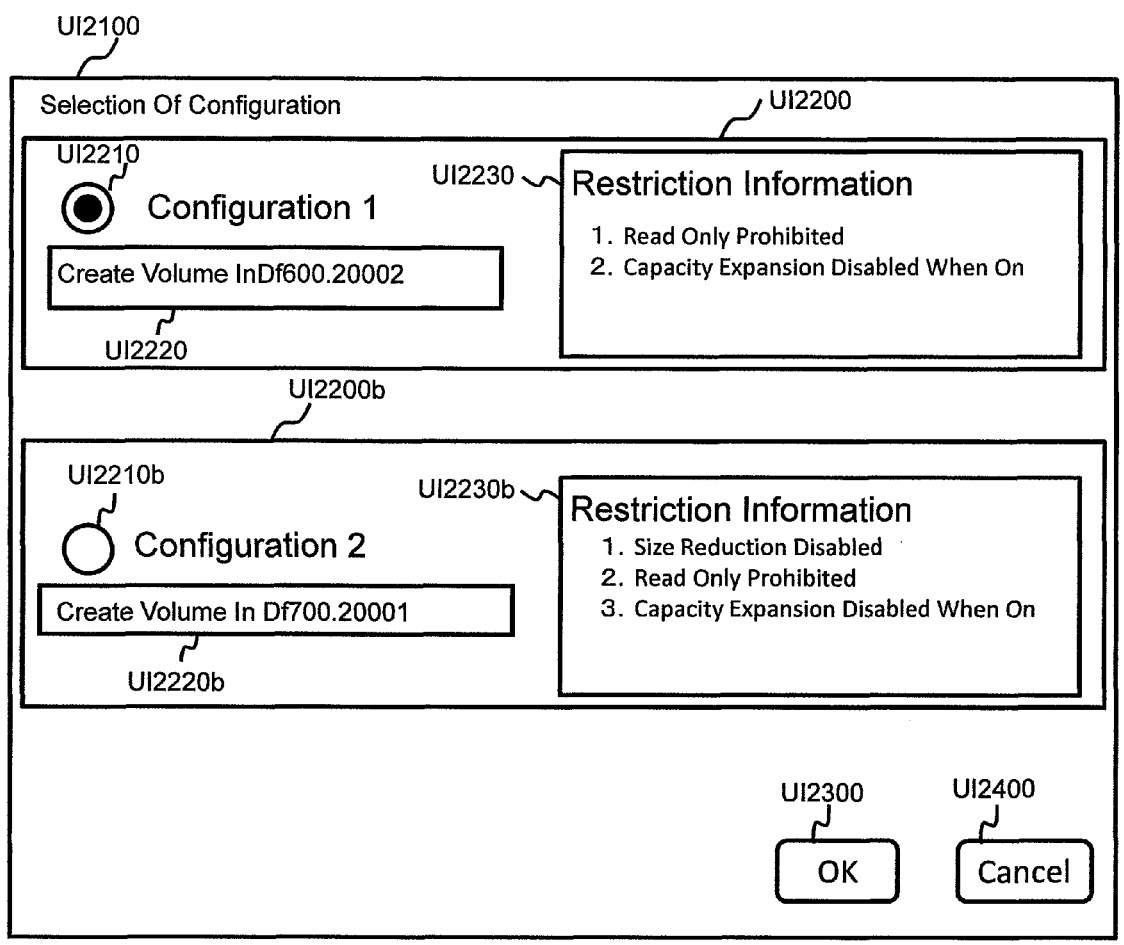
FIG. 16 shows one example of the details of a configuration specification UI screen (UI 2100).

The screen shown in FIG. 15 (UI 1100) is a screen for instructing "automatic capacity expansion" as a user request. There may be different screens (UI 1100) for each user request. Furthermore, the screen (UI 1100) may comprise a tool for inputting a user request desired by the user, from user requests of a plurality of types. In the description of FIG. 15 and FIG. 16, it is supposed that the user request "automatic capacity expansion" has been instructed.

Furthermore, in the present embodiment, in order to simplify the description, the name (or ID) of a host computer 2000 is displayed in the drop-down box UI 1200, but it is also possible to display the name (or ID) of a storage sub-system 1000. Moreover, depending on the user request, the drop-down box UI 1200 and the check items in the conditions settings table UI 1400 may be increased or decreased in number.

The user inputs a user request and a change condition to the screen (UI 1100). The user firstly selects a host computer 2000 from the drop-down box (UI 1200), for example. Thereupon, if there exists a combination of a storage sub-system 1000 and a host computer 2000 which satisfies the user request, the user selects the change condition to be set, from the conditions settings table (UI 1400). When the setting of the change condition has been completed, the user presses the button (hereinafter, candidate display button) (UI 1500), or in order to cancel the settings, the user presses the button (UI 1600). When the candidate display button (UI 1500) is pressed, information indicating the user request "automatic capacity expansion" and information indicating the instructed host computer and change condition is sent to the implementation pattern specification program 4150.

To give a specific example, "Host. 1000" is selected from the drop-down box (UI 1200) and the change condition "high allocation frequency" is instructed. The change condition "high allocation frequency" means that the frequency with which a storage area is allocated to an automatic capacity expansion volume is high. In this case, information indicating the instructed host computer "Host. 1000" and information indicating the instructed change condition "allocation frequency high" is sent to the implementation pattern specification program 4150.

FIG. 16 shows one example of the details of a configuration specification UI screen (UI 2100). The UI screen shown in FIG. 16 is a UI screen which is displayed when the user settings shown in FIG. 15 are made on the UI screen (UI 1100).

The UI screen (UI 2100) is a screen which displays a list of one or more candidate system configurations (hereinafter, also called "implementation patterns") which are provided by the implementation pattern specification program 4150. An implementation pattern desired by the user is selected from the candidate implementation patterns displayed on the list. The UI screen (UI 2100) comprises the following tools, for example:
- a configuration display area which displays the details of the implementation pattern (system configuration) (UI 2200 and UI 2200b);
- a tool employed by the user to select a configuration (for example, a radio button) (UI 2210 and UI 2210b);
- an area for displaying which logical object is set in which apparatus (set content text field) (UI 2200 and UI 2200b);
- an area for displaying restriction information indicating restrictions arising when the settings are implemented (restriction information text field) (UI 2230 and UI 2230b);
- a tool (button) used to permit the setting of a logical object in accordance with an implementation pattern (system configuration) selected by the user U12300; and
- a tool (button) UI 2400 used to cancel the setting of a system configuration.

The number of configuration display areas, radio buttons, setting content text fields and restriction information text fields may be the same as the number of system configurations which satisfy the user request and change condition. Furthermore, the number and format of the user interface displayed is not limited to the number and format shown in FIG. 16, and it is also possible to employ a user interface of another type which is capable of displaying the implementation patterns and restriction information to the user in a suitable fashion.

The user selects a radio button UI 2210 or UI 2210b corresponding to a desired implementation pattern, by means of the UI screen (UI 2100), and presses the button (UI 2300) to set up a logical object (automatic capacity expansion volume) according to that implementation pattern.

Figure 17:
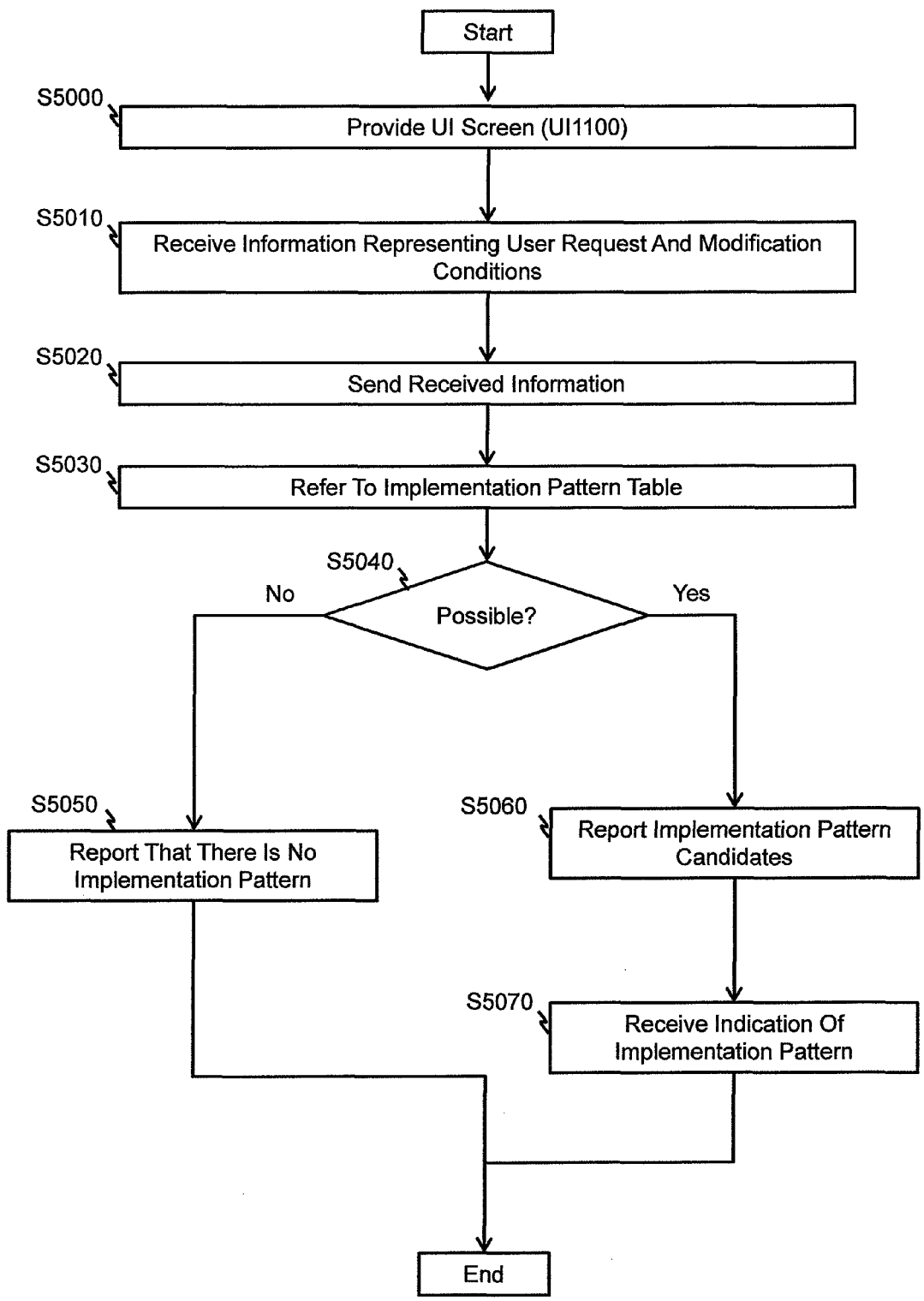
FIG. 17 shows a flowchart of processing executed by an implementation pattern specification program 4150.

FIG. 17 shows a flowchart of processing executed by the implementation pattern specification program 4150.

In step S5000, the implementation pattern specification program 4150 displays a user request UI screen (UI 1100).

In step S5010, the implementation pattern specification program 4150 receives a change condition instruction from the user via the screen (UI 1100).

Figure 18:
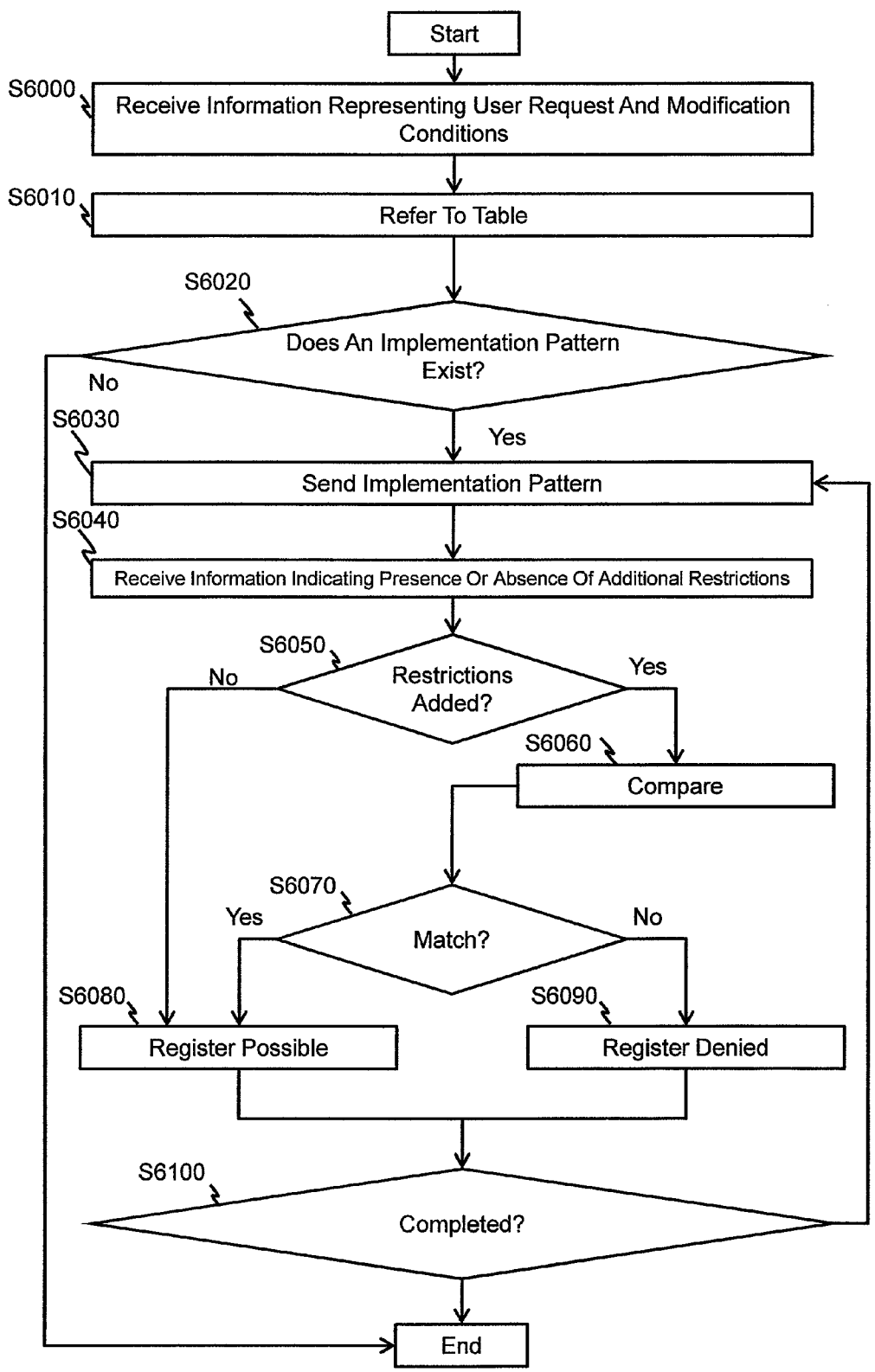
FIG. 18 shows a flowchart of processing executed by a matching configuration detection program 4160.

In step S5020, the implementation pattern specification program 4150 sends information indicating the user request and change condition to the matching configuration detection program 4160. By this means, the flow shown in FIG. 18 is started.

In step S5030, the implementation pattern specification program 4150 refers to the implementation enabled/disabled element 42306 of the implementation pattern table 4230.

In step S5040, the implementation pattern specification program 4150 judges whether or not there is a system configuration for which the implementation enabled/disabled element 42306 of the implementation pattern table 4230 is set to "enabled". If the result of this judgment is negative, then step S5050 is carried out, and if the result of this judgment is positive, then step S5060 is carried out.

In step S5050, the implementation pattern specification program 4150 displays information indicating that there is no implementation pattern (system configuration) which can be implemented.

In step S5060, the implementation pattern specification program 4150 identifies a restriction 42002 corresponding to the implementation pattern, for each implementation pattern of the which the enabled/disabled element 42306 has been set to "enabled", on the basis of the implementation pattern table 4230 and the restriction information table 4200. More specifically, the following actions are carried out, for example.

The implementation pattern specification program 4150 identifies a function ID 42001 matching the function ID 42306 having an enabled/disabled element 42306 set to "enabled".

The implementation pattern specification program 4150 identifies a restriction 42002 corresponding to the identified function ID 42001.

If there are a plurality of implementation patterns for which the enabled/disabled element 42306 is set to "enabled", then the implementation pattern specification program 4150 displays a list of a plurality of implementation patterns on the configuration specification UI screen (UI 2100), in such a manner that a plurality of implementation patterns are arranged in order of increasing number of identified restrictions 42002. For each implementation pattern, information indicating the restriction in the case of setting that implementation pattern (namely, the information indicated in the restriction column 42002) is displayed.

In step S5070, the implementation pattern specification program 4150 receives instruction of an implementation pattern desired by the user, via the configuration specification UI screen (UI 2100), and sends information indicating the instructed implementation pattern (an implementation pattern desired by the user) to the system setup program 4180.

FIG. 18 shows a flowchart of processing executed by the matching configuration detection program 4160.

In step S6000, the matching configuration detection program 4160 receives information indicating the user request and change condition from the implementation pattern specification program 4150.

In step S6010, the matching configuration detection program 4160 searches for an implementation pattern on the basis of the information (information indicating user request and change condition) received at S6000, the implementation pattern table 4230, and the restriction information table 4200. Here, the program 4160 searches for an implementation pattern which satisfies (1) and (2) below:

(1) The implementation pattern corresponds to a user request 42302 matching the received information (information indicated by the user request);

(2) The one or more restrictions 42002 corresponding to the function ID 42001 matching the function ID 42305 which corresponds to the user request 42302 in (1) above do not include a restriction 42002 matching a change condition indicated by the received information (a change condition instructed by the user).

In step S6020, the matching configuration detection program 4160 judges whether or not an implementation pattern has been found. If an implementation pattern has been found, then step S6030 is carried out. Below, the processing from step S6030 onwards is described by taking one of the one or more implementation patterns that have been found as an example. This one implementation pattern is called the "object implementation pattern" in the description of FIG. 18 and FIG. 19.

In step S6030, the matching configuration detection program 4160 executes the restriction information addition program 4170 and sends information indicating an object implementation pattern to the restriction information addition program 4170.

In step S6040, the matching configuration detection program 4160 receives information indicating whether or not restriction information has been added to the object implementation pattern, from the restriction information addition program 4170.

At step S6050, the matching configuration detection program 4160 judges whether or not restriction information has been added to the object implementation pattern, on the basis of the information received at step S6040. If the result of this judgment is positive, then step S6060 is carried out, and if the result of this judgment is negative, then step S6080 is carried out.

In step S6060, the matching configuration detection program 4160 compares the change condition indicated by the information received at S6000 (a change condition instructed by the user), with the restriction information corresponding to the object implementation pattern.

In step S6070, the matching configuration detection program 4160 judges whether or not the object implementation pattern satisfies the user's desired conditions. If the restriction information corresponding to the object implementation pattern includes restriction information which matches the change condition instructed by the user, then the result of the judgment in step S6070 is negative, whereas if the restriction information corresponding to the object implementation pattern does not include restriction information which matches the change condition instructed by the user, then the result of the judgment in step S6070 is positive. If the result of the judgment in step S6070 is positive, then step S6080 is carried out, and if the result of the judgment in step S6070 is negative, then step S6090 is carried out.

In step S6080, the matching configuration detection program 4160 stores "enabled" as the implementation enabled/disabled element 42306 corresponding to the object implementation pattern, in the implementation pattern table 4230.

In step S6090, the matching configuration detection program 4160 stores "disabled" as the implementation enabled/disabled element 42306 corresponding to the object implementation pattern, in the implementation pattern table 4230.

In step S6100, the matching configuration detection program 4160 judges whether or not the processing from step S6030 onwards has been carried out in respect of all of the implementation patterns found in step S6010. If the result of this judgment is positive, then the processing of the flow shown in FIG. 18 is terminated, whereas if the result of the judgment is negative, then step S6030 is carried out in respect of an implementation pattern for which step S6030 has not yet been carried out.

Figure 19:
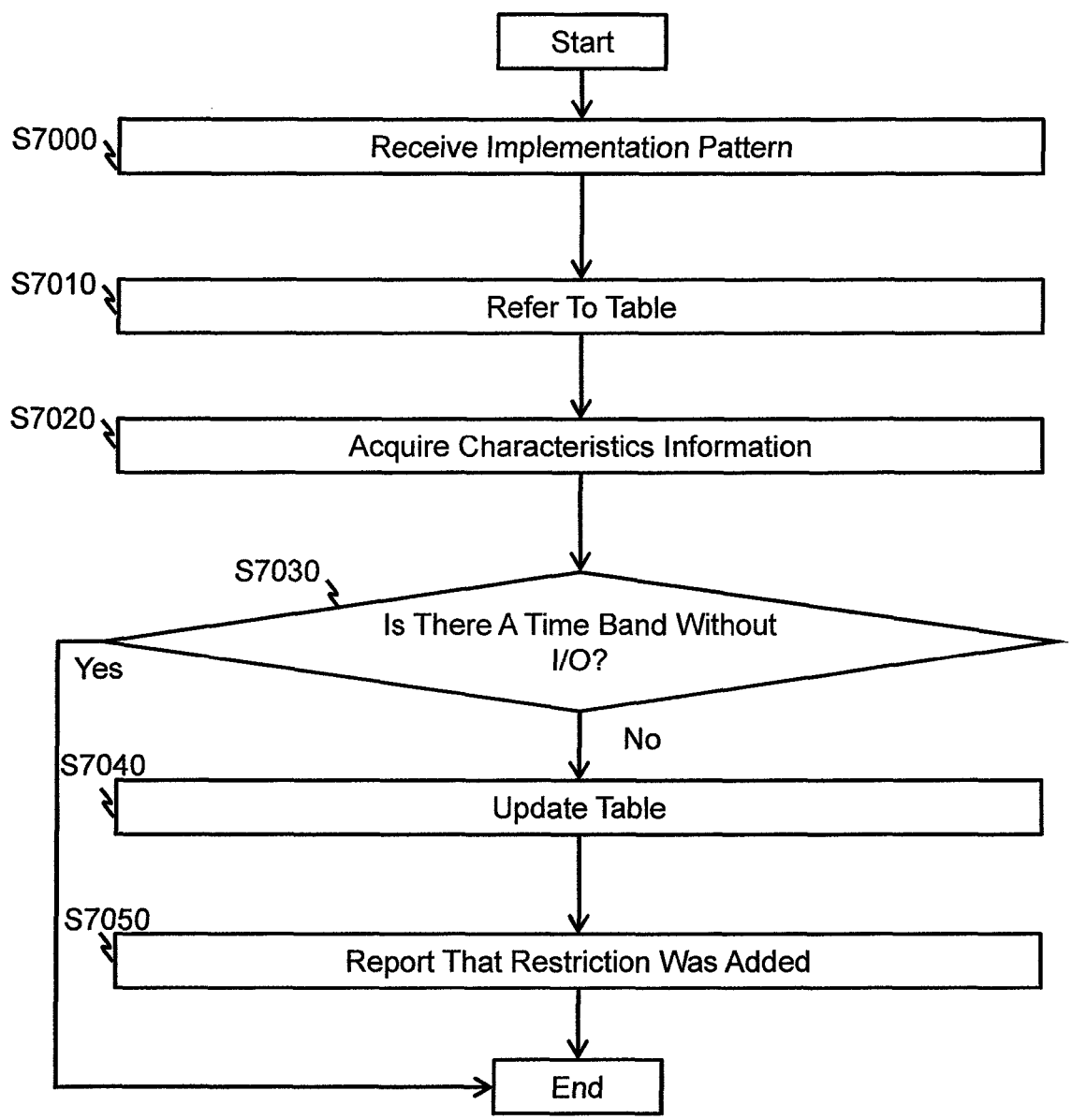
FIG. 19 shows a flowchart of processing executed by a restriction information addition program 4170.

FIG. 19 shows a flowchart of processing executed by the restriction information addition program 4170.

In step S7000, the restriction information addition program 4170 receives information indicating the object implementation pattern from the matching configuration detection program 4160.

In step S7010, the restriction information addition program 4170 refers to the system configuration information table 4220, the implementation pattern table 4230 and the characteristics table 4240, using information which indicates the object implementation pattern.

In step S7020, the restriction information addition program 4170 identifies the I/O time band of the devices (here, the HBA) belonging to the host computer 2000 constituting the object implementation pattern, on the basis of the table referred to in step S7010. More specifically, the following is carried out, for example.

The restriction information addition program 4170 identifies the host computer constituting the object implementation pattern, from the system configuration information table 4220 and the implementation pattern table 4230.

The restriction information addition program 4170 identifies one or more time 42403 corresponding to the devices (HBA) of the identified host computer.

In step S7030, the restriction information addition program 4170 judges whether or not there is a time band in which no I/O has occurred in respect of the devices of the host computer 2000 constituting the object implementation pattern. This judgment is made on the basis of the one or more time 42403 identified as described above, for example. If the result of this judgment is positive, then the processing according to the flow shown in FIG. 19 terminates and if the result of the judgment is negative, then step S7040 is carried out.

In step S7040, the restriction information addition program 4170 stores the restriction 42002 (for example, "capacity expansion disabled when on") relating to the function corresponding to the object implementation pattern, and an implementation pattern ID 42003 (for example, "1") corresponding to this restriction 42002, in the restriction information table 4200 (see, for example, the tables shown in FIG. 6 and FIG. 9).

In step S7050, the restriction information addition program 4170 reports information indicating that a restriction 42002 has been stored in the restriction information table 4200, to the matching configuration detection program 4160.

According to the processing of the flow shown in FIG. 19, the restriction information table 4200 shown in FIG. 6 may include restrictions 42002 which have been stored previously and restrictions 42002 which are added dynamically on the basis of the status (for example, the characteristics (load)) of the devices of the storage sub-system and/or the host computer.

Figure 20:
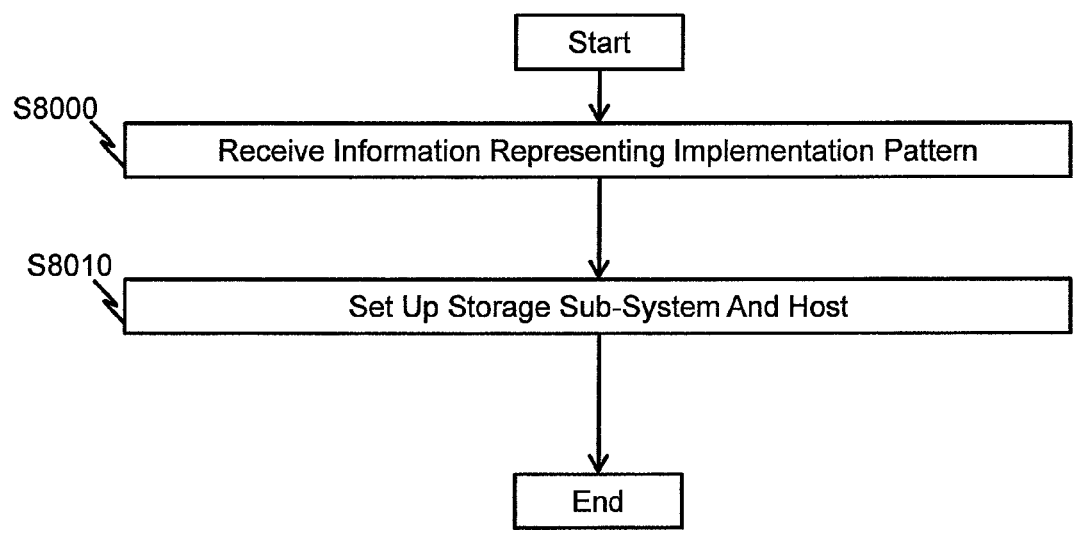
FIG. 20 shows a flowchart of processing executed by a system setup program 4180.

FIG. 20 shows a flowchart of processing executed by the system setup program 4180.

In step S8000, the system setup program 4180 receives information indicating the implementation pattern desired by the user, from the implementation pattern specification program 4150.

In step S8010, the system setup program 4180 sets up a logical object (for example, a logical volume or path) in accordance with the information received in S8000, by executing the storage setup program 1213 and the host setup program 2130.

The foregoing was a description of a first embodiment.

According to the first embodiment, the user is able to set up a logical object corresponding to a user request and change condition desired by the user, by means of a similar operation, regardless of the configuration of the computer system (the type of host computer and the type of storage sub-system). For example, according to the first embodiment, even if the storage sub-system 1000 does not have a function for creating an automatic capacity expansion volume, it is possible to identify a substitute function for achieving this function, on the basis of the required configuration table 4190 and the system configuration information table 4220. Furthermore, information indicating restrictions relating to this substitute function is identified from the restriction information table 4200, and information indicating the substitute function (implementation pattern) which satisfies the user request, and information indicating restrictions relating to the substitute function, can be shown appropriately to the user.

Furthermore, according to the first embodiment, when information indicating an implementation pattern and restriction information is shown to the user, restrictions which may occur under the current status of the computer system are identified, and information indicating the identified restrictions can be added to the restriction information table 4200.

Second Embodiment

Below, a second embodiment of the present invention is described. The following description will focus on differences with respect to the first embodiment, and points which are common with the first embodiment are either omitted or are explained briefly.

B-1. System Configuration

Figure 21:
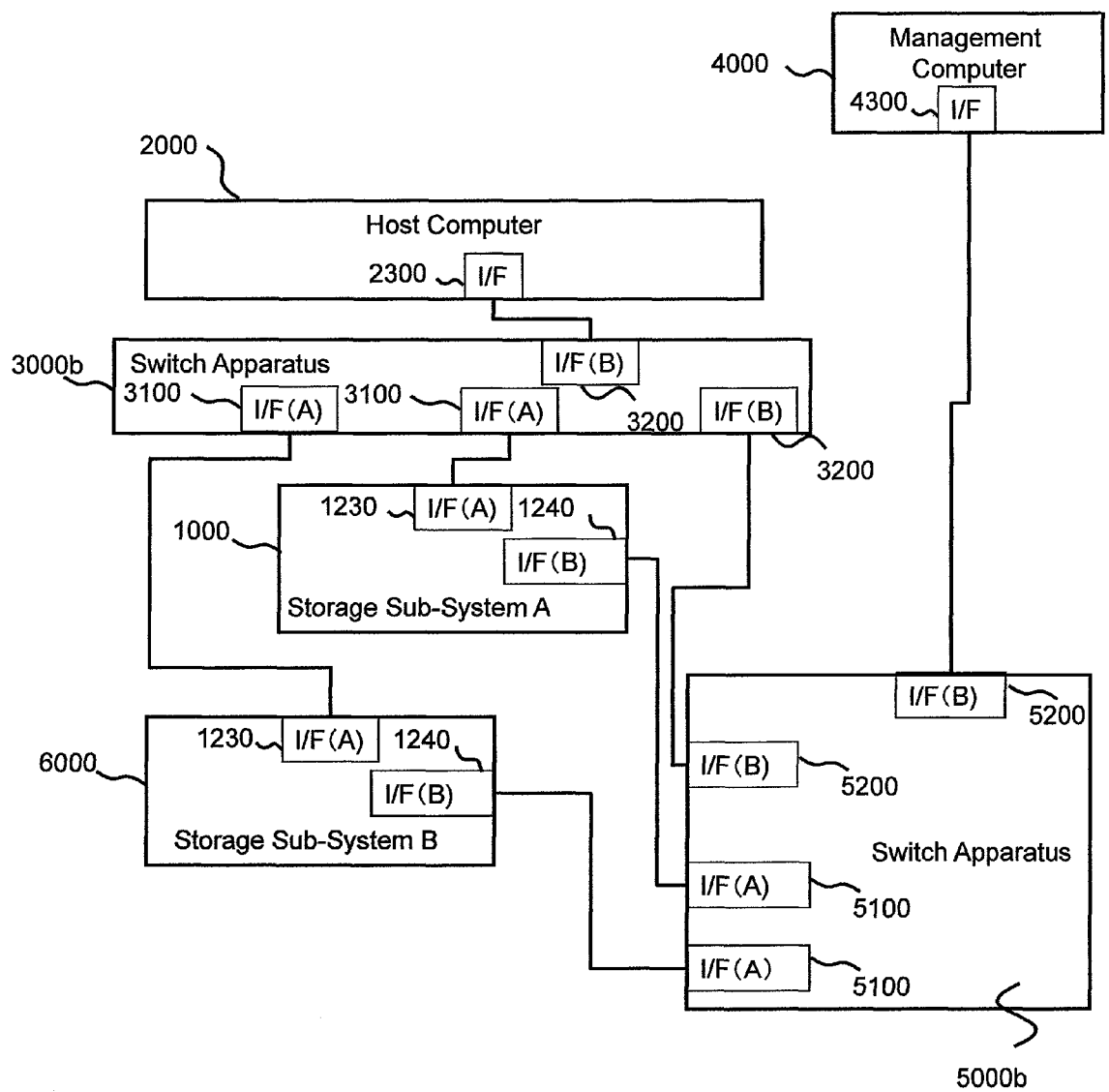
FIG. 21 is a diagram showing the composition of a computer system relating to a second embodiment of the present invention.

FIG. 21 is a diagram showing the composition of a computer system relating to a second embodiment of the present invention.

This computer system comprises a storage sub-system 1000, a host computer 2000, a switch apparatus 3000*b*, a management computer 4000, a switch apparatus 5000*b* and a second storage sub-system 6000. In the drawings, there are respectively one storage sub-system 1000, one host computer 2000, one management computer 4000 and one second storage sub-system 6000, but the invention is not limited to this and there may also be more than one of each of these. Furthermore, although there are one switch apparatus 3000 and one switch apparatus 5000 respectively, as long as the storage sub-systems 1000 and 6000, the host computer 2000 and the management computer 4000 can be coupled, the number of switch apparatuses may be zero.

The switch apparatus 3000*b* comprises an I/F 3100 for coupling with the storage sub-system 1000 and the storage sub-system 6000 and an I/F 3200 for coupling with the host computer 2000. The communications protocol used in communications between the storage sub-system 1000 and the host computer 2000 (communications via the switch apparatus 3000) may be FC or iSCSI, but is not limited in particular. Furthermore, the switch apparatus 3000*b* has an I/F 3200 for coupling with the switch apparatus 5000*b*. In the drawings, there are two I/F 3100 and two I/F 3200, but the number of interfaces is not limited to this and there may be more than one of each of these I/F.

The switch apparatus 5000*b* comprises an I/F 5100 for coupling with the storage sub-system 1000 and the storage sub-system 6000 and an I/F 5200 for coupling with the management computer 4000. The communications protocol used in communications between the storage sub-system 1000 and the management computer 4000 (communications via the switch apparatus 5000) may be TCP/IP, but is not limited in particular. Furthermore, the switch apparatus 5000*b* has an I/F 3200 used for coupling with the switch apparatus 3000*b*. In the present embodiment, there are two I/F 5100 and two I/F 5200, but the number of interfaces is not limited to this and there may be more than one of each of these I/F.

The composition of the second storage sub-system 6000 is similar to the storage sub-system 1000, and therefore description or depiction thereof is omitted here.

In the present embodiment, the storage sub-systems 1000 and 6000 have a function for copying a logical volume 1110 between the storage sub-systems (remote copying function). The host computer 2000 has a function for detecting a fault in the network I/F and automatically switching the I/F (path switching software).

B-2. Description of Data Processing Procedure

The major part of the data processing procedure of the present embodiment is the same as the first embodiment. The difference with respect to the data processing procedure of the first embodiment is the fact that when the user request indicates a copying function, the matching configuration detection program 4160 carries out processing for judging whether copying is enabled or disabled from the copy source logical volume 1110 to the copy destination logical volume 1110. As examples of processing for judging whether the copy source and copy destination logical volumes 1110 are enabled or disabled, the matching configuration detection program 4160 may carry out:

- processing for judging whether or not the capacity of the copy source logical volume 1110 is less than the capacity of the copy destination logical volume 1110, and/or;
- processing for judging whether or not the copy destination logical volume 1110 is allocated to the host computer 2000.

If the result of this judgment is positive, copying is not possible, and if the result of this judgment is negative, then copying is possible.

According to the second embodiment, even in the case of a computer system having a configuration such as that shown in FIG. 21, similarly to the first embodiment, the user is able to set up a logical object corresponding to a user request and change condition desired by the user, by means of a similar operation, regardless of the configuration of the computer system (the type of host computer and the type of storage sub-system).

Even if the storage sub-system 1000 does not have a migration function, it is possible to achieve migration between the storage sub-systems 1000 and the 6000 by combining the copy function of the storage sub-system 1000 and the path switching software function of the host computer 2000 (see, for example, FIG. 5).

Third Embodiment

Below, a third embodiment of the present invention is described. The following description will focus on differences with respect to the first or second embodiments, and points which are common with the first or second embodiments are either omitted or are explained briefly.

C-1. System Configuration

Figure 22:
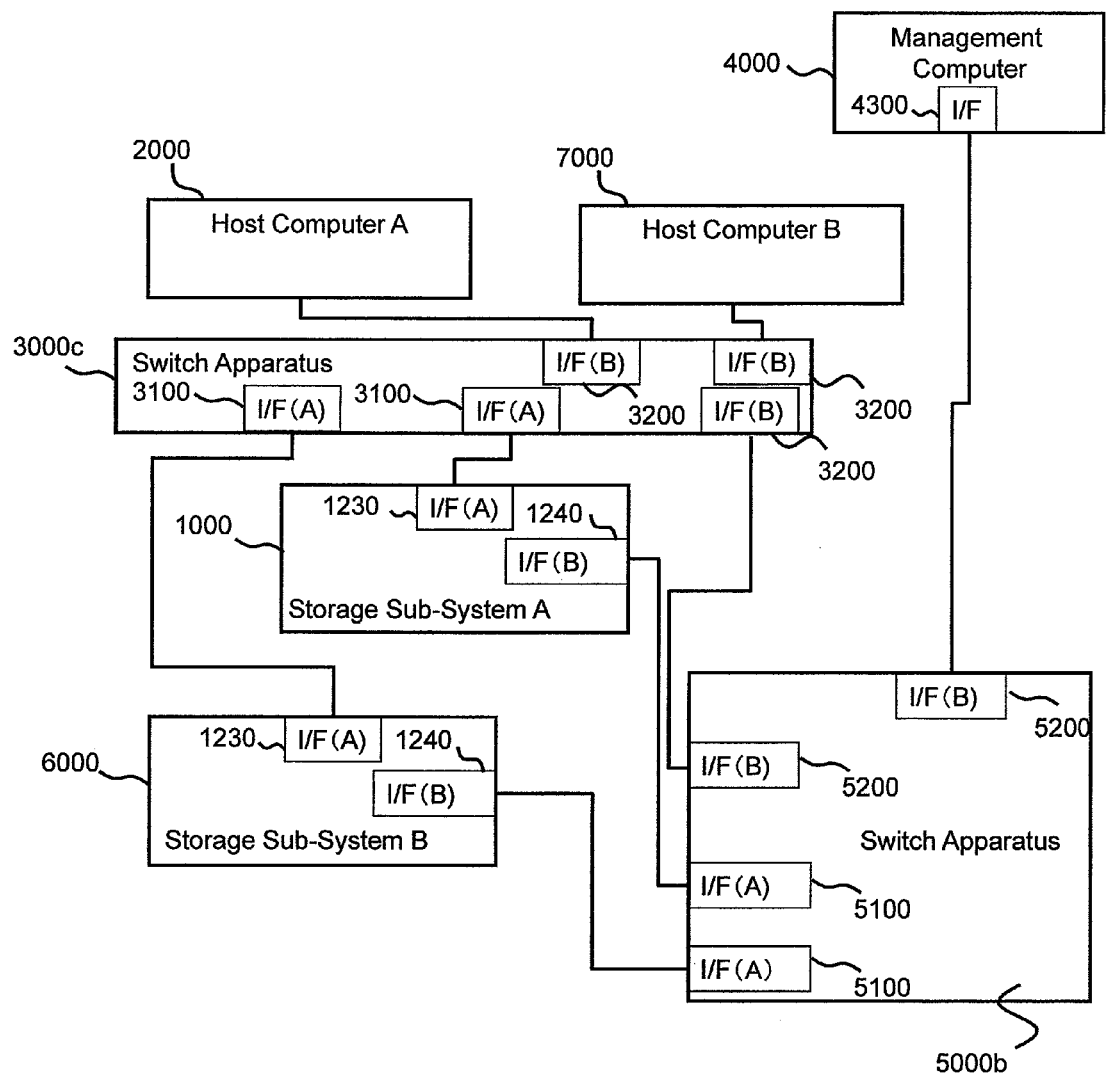
FIG. 22 is a diagram showing the composition of a computer system relating to a third embodiment of the present invention.

FIG. 22 is a diagram showing the composition of a computer system relating to a third embodiment of the present invention.

This computer system comprises a storage sub-system 1000, a host computer 2000, a switch apparatus 3000c, a management computer 4000, a switch apparatus 5000b, a second storage sub-system 6000 and a second host computer 7000. In the drawings, there are respectively one storage sub-system 1000, one host computer 2000, one management computer 4000, one second storage sub-system 6000 and one second host computer 2000, but the invention is not limited to this and there may also be more than one of each of these. Furthermore, although there are one switch apparatus 3000c and one switch apparatus 5000b respectively, as long as the storage sub-systems 1000 and 6000, the host computer 2000, the host computer 7000 and the management computer 4000 can be coupled, the number of switch apparatuses may be zero.

The switch apparatus 3000c comprises an I/F 3100 for coupling with the storage sub-system 1000 and the storage sub-system 6000 and an I/F 3200 for coupling with the host computer 2000 and the host computer 7000. The communications protocol used in communications between the storage sub-system 1000 and the host computer 2000 (communications via the switch apparatus 3000c) may be FC or iSCSI, but is not limited in particular. Furthermore, the switch apparatus 3000c has an I/F 3200 for coupling with the switch apparatus 5000b. In the drawings, there are two I/F 3100 and two I/F 3200, but the number of interfaces is not limited to this and there may be more than one of each of these I/F.

The composition of the second host computer 7000 is similar to that of the first host computer 2000, and description thereof is omitted here.

In the present embodiment, the host computer 7000 has a function for copying data on a file system, and the host computer 2000 has a function for applying access restrictions to a disk.

C-2. Description of Data Processing Procedure

The data processing procedure according to the present embodiment is the same as that of the second embodiment (or the first embodiment) and therefore description thereof is omitted.

According to the third embodiment, even in the case of a computer system having a configuration such as that shown in FIG. 22, similarly to the first and second embodiments, the user is able to set up a logical object corresponding to a user request and change condition desired by the user, by means of a similar operation, regardless of the configuration of the computer system (the type of host computer and the type of storage sub-system).

In the third embodiment, even if the host computer 2000 does not have a migration function and the storage sub-system 6000 does not have a function for creating a security volume, it is still possible to copy data to the storage sub-system 6000 using the functions of the host computer 7000 and it is still possible for the host computer 2000 to achieve redundancy of a logical volume 1110 associated with access attributes, by using the functions of the host computer 2000.

In the foregoing, several embodiments of the present invention were described, but the present invention is not limited to these embodiments and may of course be modified in various ways without departing from the essence of the invention. For example, two or more embodiments of the first to third embodiments may be combined with each other.

REFERENCE SIGNS LIST

1000 Storage sub-system

The invention claimed is:

1. A management system coupled to a computer system including one or more types of storage apparatuses comprising:
    a storage resource which stores management information; and
    a processor coupled to the storage resource,
    wherein the management information includes:
    (a) request/function correspondence information, which is information containing, for each request by an administrator to perform a function, information indicating a storage function required to achieve the function satisfying the administrator request; and
    (b) function information, which is information containing, for each storage apparatus included in the computer system, information indicating storage functions stored in each of the storage apparatuses, wherein the storage function is a function of a storage apparatus, and wherein the processor executes:

(A) reception of the request of the administrator to perform the function, wherein when the function requested by the administrator is stored in a storage apparatus of the storage apparatuses, the processor executes the function, and wherein when the function requested by the administrator is not stored in a storage apparatus of the storage apparatuses, the processor executes identification of a substitute function for achieving the function by further executing:

(A1) identification of the substitute function, which is an implementation pattern, of one or more implementation patterns, the implementation pattern being a system configuration including a storage apparatus having a storage function required to achieve a function satisfying the administrator request received in (A), based on the request/function correspondence information and the function information; and (A2) setup for achieving the function satisfying the administrator request received in (A), with respect to a specified implementation pattern, which is any implementation patter of the one or more implementation patterns identified in (A1).

2. A management system according to claim 1, wherein the management information further includes:

(c) restriction management information including information indicating restrictions with respect to a function having one or more restrictions, of the one or more functions which satisfy the administrator request, wherein in (A1), the processor identifies, in addition to the implementation pattern, restrictions relating to a function satisfying the administrator request received in (A), based on the restriction management information, and wherein the specified implementation pattern is an implementation pattern specified based on the one or more restrictions of the one or more implementation patterns identified in (A1).

3. A management system according to claim 2, wherein, in (A1), the processor displays a user interface screen showing information indicating the identified one or more implementation patterns, wherein information indicating restrictions is displayed with respect to the implementation pattern having restrictions, of the one or more implementation patterns, on the user interface screen, and wherein the specified implementation pattern is an implementation pattern selected by the administrator via the user interface screen.

4. A management system according to claim 3, wherein, in (A), the processor receives a setup condition which is a condition relating to setup, and wherein in (A1), the processor identifies an implementation patter having no restriction that matches the setup condition, of the one or more implementation patterns, for achieving the function satisfying the administrator request received in (A).

5. A management system according to claim 4, wherein the management information further includes:

(d) status information including information indicating a status of the storage apparatuses and/or the host computers, and information indicating a time of the status, and wherein the processor executes:

(X) detection of the status of the storage apparatuses and/or the host computers in the computer system, at periodic or irregular intervals, and inclusion of information indicating the detected status and information indicating the time corresponding to the status, in the status information; and (Y) determination of whether or not there is a restriction that should be added, with respect to each of the one or more implementation patterns for achieving a function satisfying an administrator request received in (A), based on the status information, and addition of the restriction that should be added, to the restriction management information, with respect to a function corresponding to an implementation pattern for which the result of the determination is affirmative.

6. A management system according to claim 5, wherein the request/function correspondence information includes information indicating a host function, which is a function of a host computer, in place of or in addition to information indicating a storage function, depending on the function which satisfies an administrator request, and wherein the one or more implementation patterns identified in (A1) include an implementation pattern including a host computer which is coupled to the storage apparatus, in addition to the storage apparatus.

7. A management system according to claim 6, wherein the setup in (A2) is creation of a logical volume.

8. A management system according to claim 7, wherein there are a plurality of types of storage apparatuses and/or a plurality of types of host computers in the computer system.

9. A management system according to claim 2, wherein, in (A), the processor receives a setup condition which is a condition related to setup, and wherein in (A1), the processor identifies an implementation pattern having no restriction that matches the setup condition, of the one or more implementation patterns, for achieving a function satisfying the administrator request received in (A).

10. A management system according to claim 2, wherein the management information further includes:

(d) status information including information indicating a status of the storage apparatuses and/or the host computers and information indicating a time of the status, and wherein the processor executes:

(X) detection of the status of the storage apparatuses and/or the host computers in the computer system, at periodic or irregular intervals, and inclusion of information indicating the detected status and information indicating the time corresponding to the status, in the status information; and (Y) determination of whether or not there is a restriction that should be added, with respect to each of the one or more implementation patterns for achieving a function satisfying an administrator request received in (A), based on the status information, and addition of the restriction that should be added, to the restriction management information, with respect to a function corresponding to an implementation pattern for which the result of the determination is affirmative.

11. A management system according to claim 1, wherein the request/function correspondence information includes information indicating a host function, which is a function of a host computer, in place of or in addition to information indicating a storage function, depending on the function which satisfies an administrator request, and wherein the one or more implementation patterns identified in (A1) include an implementation pattern including a host computer which is coupled to a storage apparatus, in addition to the storage apparatus.

12. A method of managing a computer system including storage apparatuses of one or more types, the method comprising:
- (A) receiving a request of an administrator to perform a function, performing the function when the function requested by the administrator is stored in a storage apparatus of the storage apparatuses, and identifying a substitute function for achieving the function when the function requested by the administrator is not stored in a storage apparatus of the storage apparatuses by further performing steps of:
- (A1) identifying the substitute function, which is an implementation pattern, of one or more implementation patterns, the implementation pattern being a system configuration including a storage apparatus having a storage function required to achieve a function satisfying the administrator request received in (A), based on request/function correspondence information and function information; and
- (A2) performing setup for achieving the function satisfying the administrator request received in (A), with respect to a specified implementation pattern, which is any implementation patter of the one or more implementation patterns identified in (A1),
- wherein the request/function correspondence information is information containing, for each administrator request, information indicating the storage function required to achieve a function satisfying the administrator request, and
- wherein the function information is information containing, for each storage apparatus included in the computer system, information indicating the storage functions of the storage apparatus.

13. A computer program product comprising:
- a computer program executed by a computer, the computer being coupled to a computer system including one or more types of storage apparatuses; and
- a non-transitory computer readable storage medium having the computer program tangibly embodied thereon, wherein the computer program causes the computer to execute steps of:
- (A) receiving a request of an administrator to perform a function, performing the function when the function requested by the administrator is stored in a storage apparatus of the storage apparatuses, and identifying a substitute function for achieving the function when the function requested by the administrator is not stored in a storage apparatus of the storage apparatuses by further performing steps of:
- (A1) identifying the substitute function, which is an implementation pattern, of one or more implementation patterns, the implementation pattern being a system configuration including a storage apparatus having a storage function required to achieve a function satisfying the administrator request received in (A), based on request/function correspondence information and function information; and
- (A2) performing setup for achieving the function satisfying the administrator request received in (A), with respect to a specified implementation pattern, which is any implementation pattern of the one or more implementation patterns identified in the (A1),
- wherein the request/function correspondence information is information containing, for each administrator request, information indicating a storage function required to achieve a function satisfying the administrator request, and
- wherein the function information is information containing, for each storage apparatus included in the computer system, information indicating storage functions of the storage apparatus.

* * * * *